(12) United States Patent
McCarthy et al.

(10) Patent No.: US 11,082,211 B2
(45) Date of Patent: Aug. 3, 2021

(54) SYSTEMS AND METHODS FOR SECURE COMMUNICATION USING RANDOM CIPHER PAD CRYPTOGRAPHY

(71) Applicant: 7Tunnels, Inc., Park City, UT (US)

(72) Inventors: Kevin R. McCarthy, Park City, UT (US); Michael L. Hammon, Ames, IA (US); Wesley A. Hildebrandt, Sussex, WI (US)

(73) Assignee: 7Tunnels, Inc., Park City, UT (US)

( * ) Notice: Subject to any disclaimer, the term of this patent is extended or adjusted under 35 U.S.C. 154(b) by 276 days.

(21) Appl. No.: 16/323,677

(22) PCT Filed: Aug. 11, 2017

(86) PCT No.: PCT/US2017/046520
§ 371 (c)(1),
(2) Date: Feb. 6, 2019

(87) PCT Pub. No.: WO2018/089070
PCT Pub. Date: May 17, 2018

(65) Prior Publication Data
US 2019/0182034 A1    Jun. 13, 2019

Related U.S. Application Data

(60) Provisional application No. 62/374,330, filed on Aug. 12, 2016.

(51) Int. Cl.
*H04L 9/06*    (2006.01)
*H04L 9/08*    (2006.01)
(Continued)

(52) U.S. Cl.
CPC .......... *H04L 9/0662* (2013.01); *H04L 9/0852* (2013.01); *H04L 63/0471* (2013.01); *G06F 7/588* (2013.01)

(58) Field of Classification Search
CPC .. H04L 9/0662; H04L 9/0852; H04L 63/0471
See application file for complete search history.

(56) References Cited

U.S. PATENT DOCUMENTS

2005/0166058 A1*   7/2005   Brokenshire ......... H04L 9/0662
                                                                                                       713/181
2014/0337615 A1    11/2014   Tomkow
(Continued)

FOREIGN PATENT DOCUMENTS

WO      2018/089070 A2    5/2018

OTHER PUBLICATIONS

Written Opinion from International Application No. PCT/US2017/046520 dated Apr. 27, 2018, 8 pages.
(Continued)

*Primary Examiner* — Hee K Song
(74) *Attorney, Agent, or Firm* — Phillips Winchester

(57) ABSTRACT

Systems and methods with multiple different modes for bidirectional data transfer of messages encrypted with Random Cipher Pads (RCPs) are disclosed. A direct mode is from one single endpoint to another endpoint in a peer-to-peer fashion. A throughput mode may be configured as a communication between endpoints with a cryptographic data server (CDS) managing communications and additional encryption between the endpoints. The CDS further encrypts the messages such that there is a peer-to-peer encryption between the source endpoint and the CDS and a different peer-to-peer encryption between the CDS and destination endpoints. The throughput mode may also be configured as a broadcast communication between a sender and multiple destinations, each with its own different RCP encryption. A router-to-router mode may be thought of as a specific type of peer-to-peer transfer where the peers on each end are
(Continued)

routers, servers, Virtual Private Network servers, and gateways rather than user endpoints.

21 Claims, 10 Drawing Sheets

(51) Int. Cl.
*H04L 29/06* (2006.01)
*G06F 7/58* (2006.01)

(56) References Cited

U.S. PATENT DOCUMENTS

2015/0244520 A1* 8/2015 Kariman ............... H04L 9/0656
713/168
2015/0295708 A1* 10/2015 Howe ................... H04L 9/0858
380/28

OTHER PUBLICATIONS

International Search Report from International Application No. PCT/US2017/046520 dated Apr. 27, 2018, 2 pages.
European Patent Office, European Search Report and Opinion, IA 17870020.9 National Phase Application of PCT/US2017/046520, dated Feb. 28, 2020, 9 pp.
Anonymous, "Proxy Re-Encyrption," Wikipedia, Apr. 16, 2016, https://en.wikipedia.org/w/index.php?title=Proxy_re-encryption &oldid=715494404 (Retrieved on Feb. 20, 2020), 2 pp.
Kai Schramm et al: "Higher Order Masking of the AES", Jan. 1, 2005 (Jan. 1, 2005), Topics in Cryptology—CT-RSA 2006: The Cryptographers' Track at the RSA Conference 2006, San Jose, CA, USA, Feb. 13-17, 2006; Proceedings; [Lecture Notes in Computer Science], Springer, Berlin, DE, pp. 208-225, XP019026783, ISBN: 978-3-540-31033-4.

* cited by examiner

US 11,082,211 B2

SYSTEMS AND METHODS FOR SECURE COMMUNICATION USING RANDOM CIPHER PAD CRYPTOGRAPHY

CROSS-REFERENCE TO RELATED APPLICATIONS

This application is a national phase entry under 35 U.S.C. § 371 of International Patent Application PCT/US2017/046520, filed Aug. 11, 2017, designating the United States of America and published in English as International Patent Publication WO 2018/089070 A1 on Aug. 11, 2017, which claims the benefit of the filing date under Article 8 of the Patent Cooperation Treaty of U.S. Provisional Patent Application Ser. No. 62/374,330, filed Aug. 12, 2016, for "Systems and Methods for Secure Communication Using Random Cipher Pad Cryptography," the disclosure of each of which is hereby incorporated herein in its entirety by this reference.

TECHNICAL FIELD

Embodiments of the present disclosure relate generally to cryptography and, more specifically, to encryption and decryption using data and structures similar to one-time pads.

BACKGROUND

Cryptography is important for many types of communications including, but certainly not limited to, communications involving financial data, medical data, and government classified data. Many types of encryption are very difficult to decrypt, but can eventually be broken. Other types of encryption have significant vulnerabilities making decryption relatively easy. Conventional one-time pads are generally considered completely secure and unbreakable. However, conventional one-time pads have a drawback related to how to convey the one-time pads to keep them secret. Moreover, for conventional one-time pads, the length of the key is equal to the length of the data to be encrypted, which may be unsuitable for low-bandwidth applications even if secure conveyance of the one-time pad is possible.

DETAILED DESCRIPTION

Figure 1:
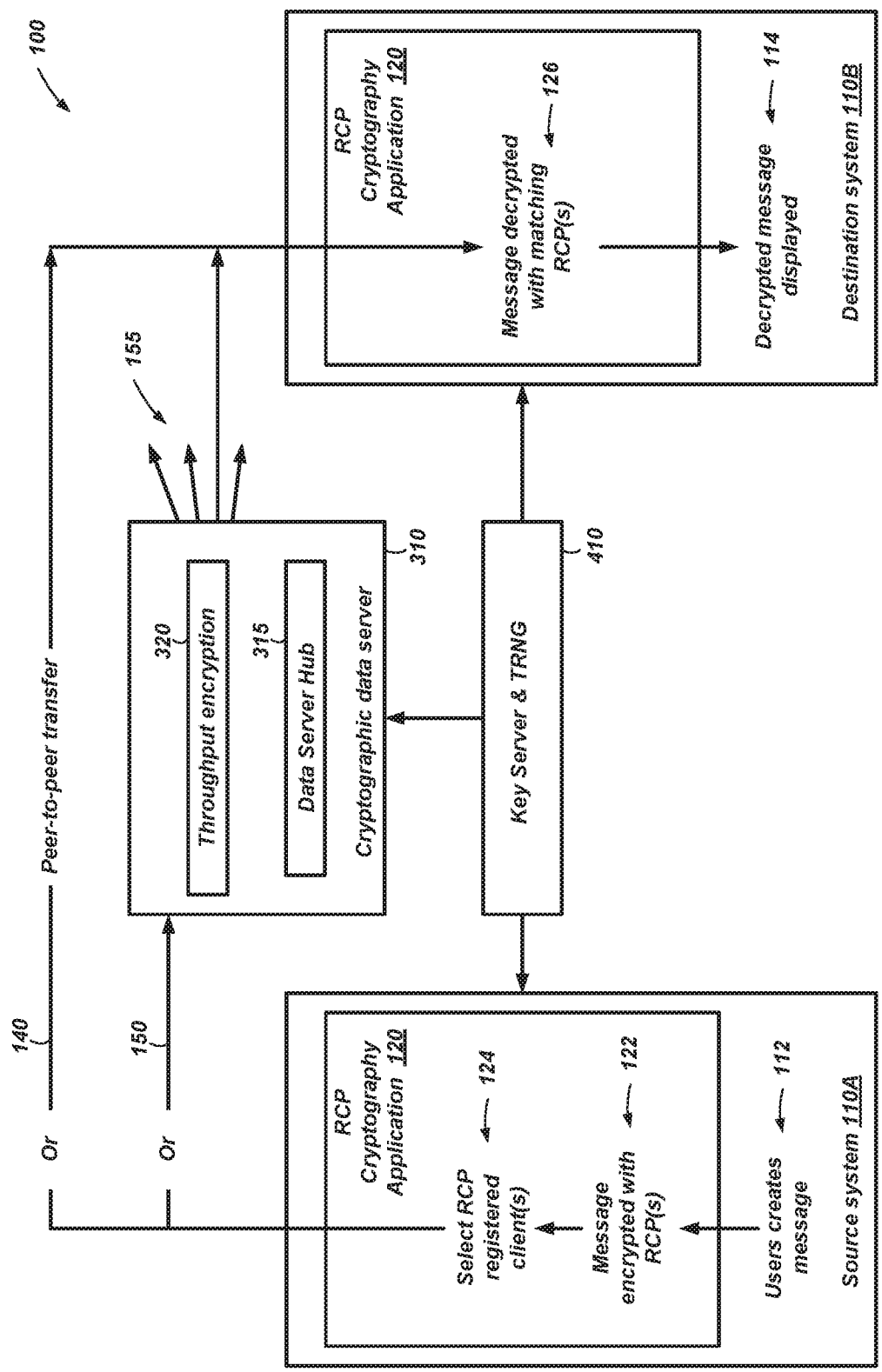
FIG. 1 is a block diagram illustrating cryptographic systems for communicating information using Random Cipher Pads (RCPs).

In the following detailed description, reference is made to the accompanying drawings, which form a part hereof, and in which are shown, by way of illustration, specific example embodiments in which the present disclosure may be practiced. These embodiments are described in sufficient detail to enable a person of ordinary skill in the art to practice the present disclosure. However, other embodiments may be utilized, and structural, material, and process changes may be made without departing from the scope of the disclosure. The illustrations presented herein are not meant to be actual views of any particular method, system, device, or structure, but are merely idealized representations that are employed to describe the embodiments of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

It will be readily understood that the components of the embodiments as generally described herein and illustrated in the drawing could be arranged and designed in a wide variety of different configurations. Thus, the following description of various embodiments is not intended to limit the scope of the present disclosure, but is merely representative of various embodiments. While the various aspects of the embodiments may be presented in drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. For example, data, instructions, commands, information, signals, bits, symbols, and chips that may be referenced throughout this description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general purpose processor, a special purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure.

Also, it is noted that the embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, etc. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

Elements described herein may include multiple instances of the same element. These elements may be generically indicated by a numerical designator (e.g., 110) and specifically indicated by the numerical indicator followed by an alphabetic designator (e.g., 110A) or a numeric indicator preceded by a "dash" (e.g., 110-1). For ease of following the description, for the most part element number indicators begin with the number of the drawing on which the elements are introduced or most fully discussed. Thus, for example, element identifiers on a FIG. 1 will be mostly in the numerical format 1xx and elements on a FIG. 4 will be mostly in the numerical format 4xx.

Headings may be included herein to aid in locating certain sections of detailed description. These headings should not be considered to limit the scope of the concepts described under any specific heading. Furthermore, concepts described in any specific heading are generally applicable in other sections throughout the entire specification.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

Reference throughout this specification to "one embodiment," "an embodiment," or similar language means that a particular feature, structure, or characteristic described in connection with the indicated embodiment is included in at least one embodiment of the present disclosure. Thus, the phrases "in one embodiment," "in an embodiment," and similar language throughout this specification may, but do not necessarily, all refer to the same embodiment.

Embodiments described herein facilitate utilization of Random Cipher Pads (RCPs), which may be somewhat similar to conventional one-time pads, but used in new and different ways. The RCPs are used not only to encrypt information (for example, documents, media streams, and data files), but also to encrypt subsequent RCPs that in turn can be used by the original users recursively.

Conventional one-time pad encryption is generally recognized as being unbreakable. Similarly, RCPs include these unbreakable attributes as long as the method to use RCPs recursively is set up for the originator and recipient(s). Thus, an endless number of RCPs can be used by them, as long as the party generating the RCPs continues to send subsequent RCPs encrypted by the preceding RCPs and the used RCPs are destroyed.

Interception of the transmission generally will not help an intruder since RCP encryption cannot be broken. At worst, the intended recipient will not receive the transmission intended for him and will contact the sender, uncovering a theft or loss of information.

In some embodiments, the initial RCP exchange installation is done "outside" the electronic environment, or done in a highly secure manner with full authentication of Sender and Recipient. This results in a situation where each subsequent RCP cannot be decrypted and therefore cannot be intercepted for use.

This setup allows an enterprise, for example, an HMO that needs to send medical records to thousands of customers compliant with the Health Insurance Portability and Accountability Act (HIPPA), a way to insure that customer or participant information is not being stolen.

As another example, it also assures that transmission of information between two government agencies, for instance the Justice Department and the Treasury Department, is always secure during transmission.

Conventional one-time pads are currently not practical for ubiquitous use, or even enterprise use, because each pad is a singular event and the sender and recipient(s) must have an identical pad for each transmission. Identical pads are requisite for encryption and decryption. Heretofore, conventional one-time pads between sender and receiver were exchanged using Public Key Encryption (PKE), which is breakable. The use of PKE to "secure" exchange of pads is not secure, and increasingly vulnerable. Delivering a new pad manually (e.g., by mail or courier) for each new use is impractical, costly, and inefficient; plus, the method of getting each successive pad into one or more recipients' hands creates vulnerabilities.

The following aspects, presented in separate or cumulative embodiments, present functionality opportunities possible with RCP encryption methods or processes. In general, a RCP may be used for data encryption and separately used for encrypting features of the encryption process itself. In other words:
1. The original RCP can be used to encrypt for electronic transmission a new, uncorrelated RCP that is also unbreakable.
2. The new uncorrelated RCP is encrypted using a RCP that came before it, meaning that the new RCP cannot be decrypted or used even if intercepted.
3. Multiple new RCPs can be generated and transmitted (along with the documents or information they encrypt or separately) by the original user(s).

Stated another way, embodiments of the present disclosure include apparatuses and methods for providing cryptographic procedures including remapping a current RCP into an uncorrelated random variable used for securely passing a replacement RCP. These embodiments are configured to reduce and/or eliminate attack surfaces. This recursive process implies that an initial RCP and mapping data may be installed in conjunction with original software installation as part of an end-point registration process. The initial RCP and mapping data may be configured such that they include matching data on a server or other device. In order to insure the integrity of the system an initial install including the initial RCP should be completed using high security protocols.

Before describing specific embodiments, and in order to facilitate description in the present disclosure, various terms are described herein. Where ambiguity may exist between the plain meaning, dictionary meaning, and the term as described herein, a person of ordinary skill in the art will recognize the term as described herein will best conform to a more comprehensive understanding of embodiments of the present disclosure.

A "True Random Number Generator" (TRNG) is a hardware device, and associated software if needed, used to generate truly random numbers from an unpredictable quantum or non-quantum physical process. Quantum examples of these processes include nuclear decay, photons transmitted through a partially transparent mirror, and fluctuations in vacuum energy. Non-quantum examples include thermal noise, clock drift, and RF noise.

A "One Time Pad" (OTP) is a conventional random cipher key pair in which each key pair is used only once and then destroyed. One key of the pair is used to encrypt a message and the other key of the pair is used to decrypt the encrypted message. Commonly OTPs are a method of symmetric encryption and the keys are identical.

A "Random Cipher Pad" (RCP) is a different form of an OTP according to embodiments of the present disclosure. The term RCP may be used as a generic term for various species of RCPs. An RCP is a collection of truly random numbers, e.g., gathered from one or more TRNGs. The use of the word "random" evokes the protection an OTP offers by alluding to the truly random nature of the cipher. Although the size of the RCPs could vary between instantiations, or perhaps even within a particular instantiation, RCPs in many instances are measured in kilobytes or even larger units.

An "RCP pool" is a collection of RCPs. Each RCP within a RCP pool may be identified by a number that is unique within that pool (e.g., a sequential integer). Globally Unique IDentifiers (GUIDs), each comprising a unique 128-bit number, may be used as identifiers such that careful construction of this number can guarantee global uniqueness within any particular system. Thus, in some embodiments, each RCP pool may be identified with a GUID. Moreover, while a simple sequential identifier may be used to identify each RCP within a RCP pool, a GUID, a hash of the RCP, or other type of unique identifier may be used instead to identify each RCP within a RCP pool.

A "Data RCP" is a species of RCP used to encrypt and decrypt communications between two or more endpoints. Each Data RCP is only used once.

A "Random Cypher Key" (RCK) is a data RCP, a portion of a Data RCP, a combination of two or more data RCPs, or a combination of portions of two or more Data RCPs such that the RCK has a length corresponding to a length of a message that is to be operated on by the RCK.

A "Key RCP" is a species of a RCP used to encrypt and decrypt a Data RCP to securely transfer it electronically. Each Key RCP is only used once.

"Mapping" is a process of converting a Data RCP, once used, into a Key RCP for secure transfer of a subsequent Data RCP.

A "mapping index" is a list of numbers that includes the integers from one through the number of units (e.g., bytes, words, etc.) in a Data RCP in random order. The mapping index may be encrypted and sent to the appropriate endpoints of a particular communication channel and may be used as part of the process to convert Data RCPs into Key RCPs.

The terms "encrypted," "encrypted data," "encrypted data structure," and "encrypted message" refer to data that has passed through an encryption process according to embodiments of the present disclosure. As a non-limiting example, encrypted data may be generated by performing a bitwise exclusive-OR between a plain text message and a RCP.

The terms "decrypted," "decrypted data," "decrypted data structure," and "decrypted message" refer to data that was previously encrypted and has been returned to its original value. As a non-limiting example, decrypted data may be generated by performing a bitwise exclusive-OR between an encrypted message and the same RCP that was used to encrypt the plain text message.

The terms "unencrypted," "unencrypted data," "unencrypted data structure," and "unencrypted message" refer to data that has never been encrypted.

The term "commutative" refers to a characteristic of the application of multiple RCPs in a manner that the order in which data is encrypted using multiple RCPs does not matter. In other words, as long as the same set of RCPs is used to encrypt and decrypt, using the RCPs in different orders for encryption and decryption will produce the same final result.

The term "pad" may be generically used herein to refer to a RCP according to embodiments of the present disclosure. In contrast, a conventional one-time pad is explicitly referred to as a conventional one-time pad or a one-time pad and not simply as a pad.

Implementation Overview

This section describes an overview of certain embodiments before a detailed description of each of the figures. Embodiments of the device and method described herein allow the RCP currently in use to be re-used to encrypt and send the next RCP. Since the data in this case is purely random and the current RCP is destroyed after use, there is no opportunity to perform cryptographic analysis.

Furthermore, in some embodiments as an additional safeguard the sampling sequence while using the RCP may not be sequential. For example, one of many randomization methods might be to start using the RCP at a random pad address and then advance through the RCP using a random step size. The information about starting address and step size would be sent to the decryption device along with the data to be decrypted.

It is a characteristic of RCP encryption that if an exclusive OR operation is used to encrypt the data then applying the exclusive OR (XOR) a second time (with the same RCP data) will decrypt the data. Therefore, the encryption and decryption processes are similar. However, encryption and decryption are not restricted to the use of XOR as the encryption operator for the RCP encoder and decoder. Any suitable symmetric operation could be used.

Since new RCPs are encrypted and downloaded using old RCPs, some embodiments address the origin of the first RCP that is used. In some embodiments, each pair of installations is unique and contains a relatively large seed RCP. In some embodiments, the seed RCP is never deleted and only used during product initialization and product disaster recovery. After several uses, the seed RCP may be replaced. This process would be done by using tamper evident transmission or courier delivery.

An example embodiment of a process for sending a secure document is described below. In this description, it is assumed that both parties (designated as "A" and "B") have completed installation and initialization of the product.

1. A has a document and wants to send it to B.
2. The process performs any required pre-processing and starts scanning the document and RCP byte by byte.
3. A randomly picks the randomization method and constants to be used to determine the path through the RCP.
4. Authentication, hash values, check sums, and byte counts may be pre-computed and embedded with the un-encrypted data.
5. Each byte of the document (and metadata) is ex-ORed with the corresponding RCP byte and held in a temporary location.
6. When encryption is complete, A embeds the RCP randomization method and constants with the encrypted data. This metadata may not be encrypted, but it may be obfuscated so it appears to be part of the encrypted stream.
7. A sends this encrypted data to B via standard methods (e.g., TCP/IP, FTP, and HTTP).
8. When this data is received by B, B follows the reverse procedure to recover the unencrypted data.

In some embodiments, RCP generation takes place on the computer that has the greatest resources, either on the sender's computer or on the recipient's computer. Alternatively, the RCP generation may be performed by a third-party intermediary computer or reference computer (e.g., a RCP server 710, see FIG. 7).

RCP generation may run in its own thread and take place with very little communication with the encryption/decryption (client) thread. In some embodiments, the two client threads maintain a local pool of several RCPs, which they can quickly switch to as the decision is made to retire the current RCP. When that pool drops below a specified number the RCP maintenance thread requests the RCP generator thread send another RCP pair to the two clients' RCP pools. The client maintenance thread also may maintain the RCP use count, which determines when RCPs should be retired.

The RCP generator thread may monitor its pool level causing the True Random Number Generator (TRNG) to produce new RCPs. In some embodiments, the quality of the TRNG is important. The size of RCPs may be intentionally kept as small as is realistic. Keeping the RCPs small may help to avoid unnecessary RCP latency. The faster RCPs are used and destroyed, the more secure the system is.

Although RCP sizes may vary in different implementations, or even over different stages of the same communications stream between sender and receiver devices, current prototypes have RCP sizes of 100,003 bytes (the smallest prime greater than 100,000). There may be path randomization benefits to prime sizes.

"Large" files may be defined as anything larger than the RCP size. On average, the RCP will be retired for every {RCP size} bytes of data. As a result, a 1 gigabyte file will use and retire around 10,000 RCPs, and the same file will be sent in 10,000 segments that are re-assembled at the receiving thread.

Conversely, a small file of about 1,000 bytes, with no other file activity would not replace the RCP until it was naturally retired. Therefore, the time to retain partially used RCPs during inactive periods can be specified by the user.

During decryption several factors may be monitored to guarantee message integrity (Authentication, hash values, check sums, and byte counts) when these fail the data block is refused by sending a NAK (Negative AcKnowledgement) signal to the sender. This causes the sender to reformat and resend the message. If everything is OK, the recipient sends an ACK (ACKnowledgement) signal to the sender who then formats and sends the next block.

In some embodiments, some or all of the encryption features described herein are implemented within a computer processor or processing device that executes the encryption procedures. The transformation of data that occur according to the specific encryption techniques described herein render the processing device as a special-purpose processing device capable of new functionality that is otherwise not available using conventional programming or logical procedures. Furthermore, efficient processing of such encryption procedures requires implementation within computer processing systems. Furthermore, the interactions between an electronic storage device to store data associated with the encryption techniques described herein and the computer processing devices to execute the encryption techniques described herein achieve much greater efficacy than would be possible through other non-computerized means.

Implementation Details

FIG. 1 is a block diagram illustrating cryptographic systems 100 for communicating information using Random Cipher Pads (RCPs). Embodiments of the present disclosure offer multiple different modes for bidirectional data transfer of RCP encrypted messages.

A direct mode 140 is from one single endpoint 110A (also referred to as a source system 110A) to another endpoint 110B (also referred to as a destination system 110). This mode may also be referred to herein as a point-to-point mode and a peer-to-peer mode.

A throughput mode 150 may be configured as a communication between endpoints (110A and 110B) with a server 310 (also referred to as a cryptographic data server 310) managing communications and additional encryption between the endpoints (110A and 110B). The throughput mode may also be configured as a broadcast communication between a sender and multiple destinations, each with its own different RCP encryption.

A Router-to-Router (R2R) mode may be thought of as a specific type of peer-to-peer transfer where the peers on each end are routers, servers, Virtual Private Network (VPN) servers, and gateways rather than user endpoints. R2R mode may be useful for bulk transfers by one or several participants all connected to the same router on either end. R2R mode encrypts traffic from one router to another router, WiFi connections and direct connection to the router may not be secured, so the R2R mode may be more appropriate to an environment where eavesdropping at each physical router location is well controlled, while communications between the routers is managed with RCP cryptography to create a RCP encrypted VPN. R2R mode is discussed more fully below in connection with the discussion of FIG. 5.

For both direct transfers 140 and throughput transfers 150 a sending user creates or selects 112 the content for transfer, transfers the message to a RCP cryptography application 120 where RCP encryption 122 takes place using RCP(s) comprised of true random numbers.

Direct transfers 140 are accomplished by simply selecting 124 a destination system 110B that already has a paired relationship with the source system 110A and pressing send. The destination system 110B receives the message into the RCP cryptography application 120 on the destination end and using a matching RCP decrypts 126 the message. The decrypted message may then be displayed 114 or further processed on the destination system 110B. Used RCPs are destroyed as they are used and are never to be reused.

Throughput transfers 150 start the same way as direct transfers 140. However, in throughput transfers 150 the source system 110A has a RCP paired relationship only with the cryptographic data server 310, which maintains multiple RCP paired relationships with various authorized end-points and, as a result, acts as a data server hub 315. The RCP cryptography application 120 on the source system 110A encrypts 122 the message with a RCP matching one on the cryptographic data server 310, the cryptographic data server 310 then performs throughput encryption 320 of the already encrypted message with a new, different RCP for each and every destination system 110B, sending the differently encrypted message 155 on to the destination system(s) 110B for decryption. Each destination system 110B receives the message into the RCP cryptography application 120 and using a RCP that is paired with a matching RCP on the cryptographic data server 310 decrypts 126 the message. The decrypted message may then be displayed 114 or further processed on each destination system 110B. Every transmission has only two end-points and each character of every message is uniquely and individually encrypted with a RCP that is destroyed never to be used again.

In more detail, the user creates message traffic on a source device 110A (e.g., on a computer, tablet computer, or handheld computer) and uploads the message to the RCP cryptography application 120 running on the source system 110A. The RCP cryptography application 120 includes one or more RCPs that have been loaded onto the application from a key server 410. The key server 410 includes TRNG hardware for generating the RCPs. The RCPs generated for the source system 110A will also be delivered to a destination system 110B in the peer-to-peer transfer mode. In the case of the throughput mode, the RCPs generated for the source system 110A may be maintained on the key server 410 or delivered to the cryptographic data server 310. Additional details for these two locations for the RCP are discussed below in combination with FIGS. 3 and 4.

After the message is encrypted on the source system 110A, the sending user selects one or more recipients 124 that are registered clients (e.g., clients that have RCPs and RCP cryptography application software 120 delivered to them).

If the source system 110A is using the peer-to-peer mode, the encrypted message is sent 140 directly to a destination system 110B. The peer-to-peer mode is discussed further below in combination with FIG. 2.

If the source system 110A is using the throughput mode, the encrypted message is sent 150 to the cryptographic data server 310 along with a list of recipients, which may be embedded in the encrypted message. The cryptographic data server 310 uses the list of recipients from the source system 110A to further encrypt the message and send it on to the appropriate destination system 110B. The throughput mode is discussed further below in combination with FIGS. 3 and 4.

As shown on the right side of FIG. 1, whether an encrypted message is received from another peer or from the cryptographic data server 310, a RCP cryptography application 120 running on the destination system 110B receives the encrypted message and uses a RCP that corresponds with the RCP on the source system 110B, or the cryptographic data server 310, to decrypt the message and the plain text message may be passed to any appropriate application running on the destination device for presentation to the user. For example: if the plain text message is an image, the plain text message may be passed to an image viewer application; if the plain text message is text, the plain text message may be passed to a word processing application; if the plain text message is an audio recording, the plain text message may be passed to an audio player application.

Figure 2:
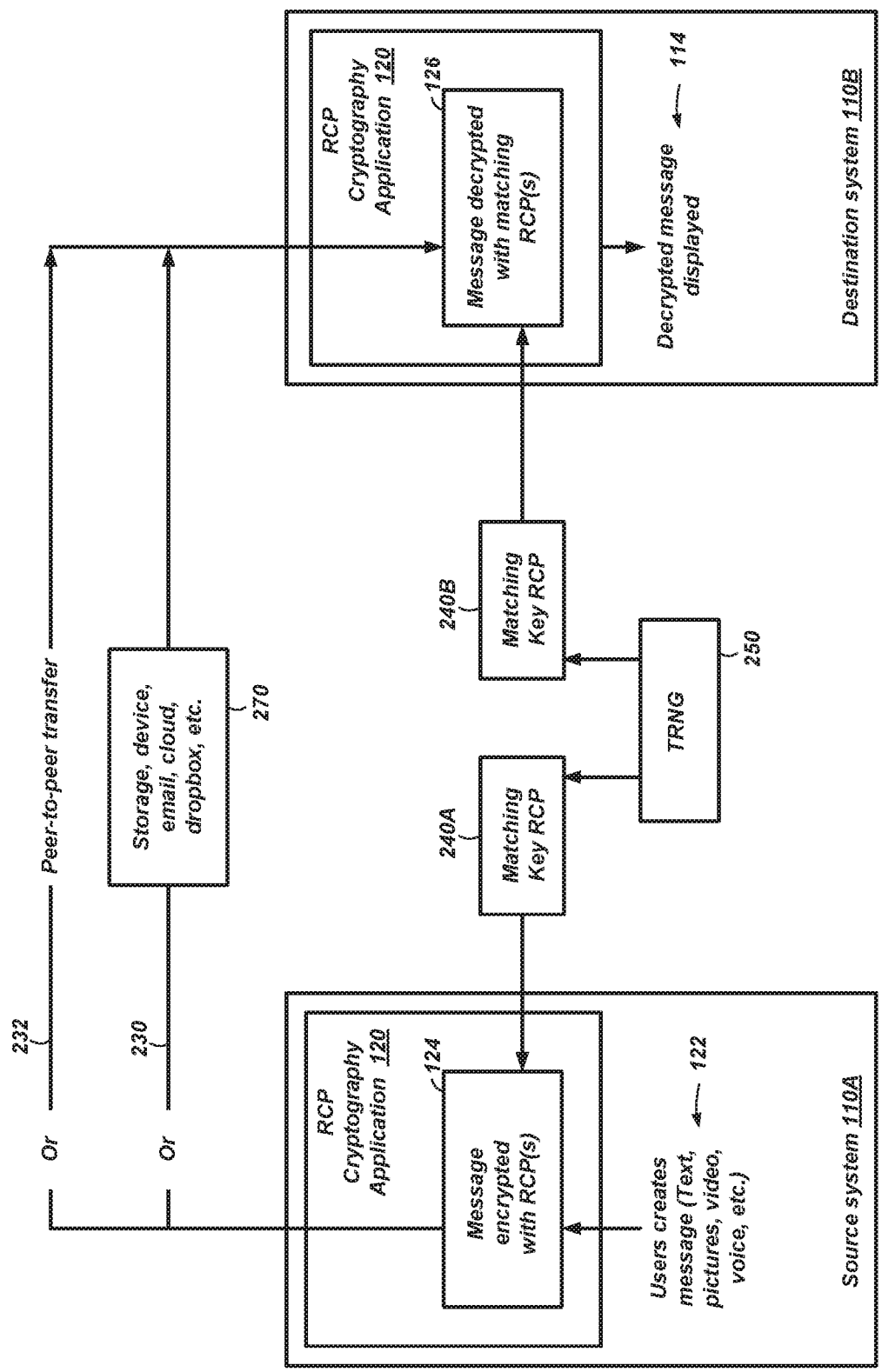
FIG. 2 is a block diagram illustrating peer-to-peer message cryptography using RCPs.

FIG. 2 is a block diagram illustrating peer-to-peer message cryptography using RCPs. The peer-to-peer mode may be configured as software or firmware or be integrated into hardware, fitting seamlessly into existing system infrastructures and technology products. Such a system constructs Random Cypher Pads (RCPs) consisting of a series of True Random Numbers which are completely unpredictable and unreproducible, which may be generated by quantum mechanical uncertainty and guaranteed by the laws of quantum physics.

These RCPs are supplied in matching pairs to paired end-points either dynamically under encryption or physically distributed. One example of dynamic distribution and the RCP encryption process is discussed below with respect to FIGS. 7-9.

In the case where a single user places 230 encrypted data into storage 270, only a single RCP may be utilized without a matching RCP ever defined. Each time stored data is retrieved and decrypted the RCP is destroyed and a new one used for subsequent encryption. However, it should be noted that, in some embodiments, the encrypted storage may also be used as an indirect means of communication. In other words, user 1 could store 230 the encrypted message on a transportable storage device 270 or in cloud storage 270, such as drop box. User 2 could then retrieve the encrypted message from the transportable storage device or cloud storage and use the corresponding RCP for decryption.

In the peer-to-peer mode a sending user creates or selects 124 the content for transfer and loads the message to the RCP cryptography application 120 on the source system 110A where encryption 122 takes place using a RCP comprised of true random numbers.

Direct transfers 232 are accomplished by simply selecting a destination system 110B that already has a paired relationship with the source system 110A and pressing send. The destination system 110B receives the message into the RCP cryptography application 120 on the destination system 110B and using a matching RCP decrypts 126 the message. The decrypted message may then be displayed 114 or further processed on the destination system 110B. In most embodiments, used RCPs are destroyed as they are used and are never to be reused.

In some embodiments, the TRNG hardware 250 may be a standalone device for providing the matching RCPs (240A and 240B) to each of the paired peers. In other embodiments, the TRNG hardware 250 may be part of a data server (not shown) for providing the RCPs to various paired user devices.

Figure 3:
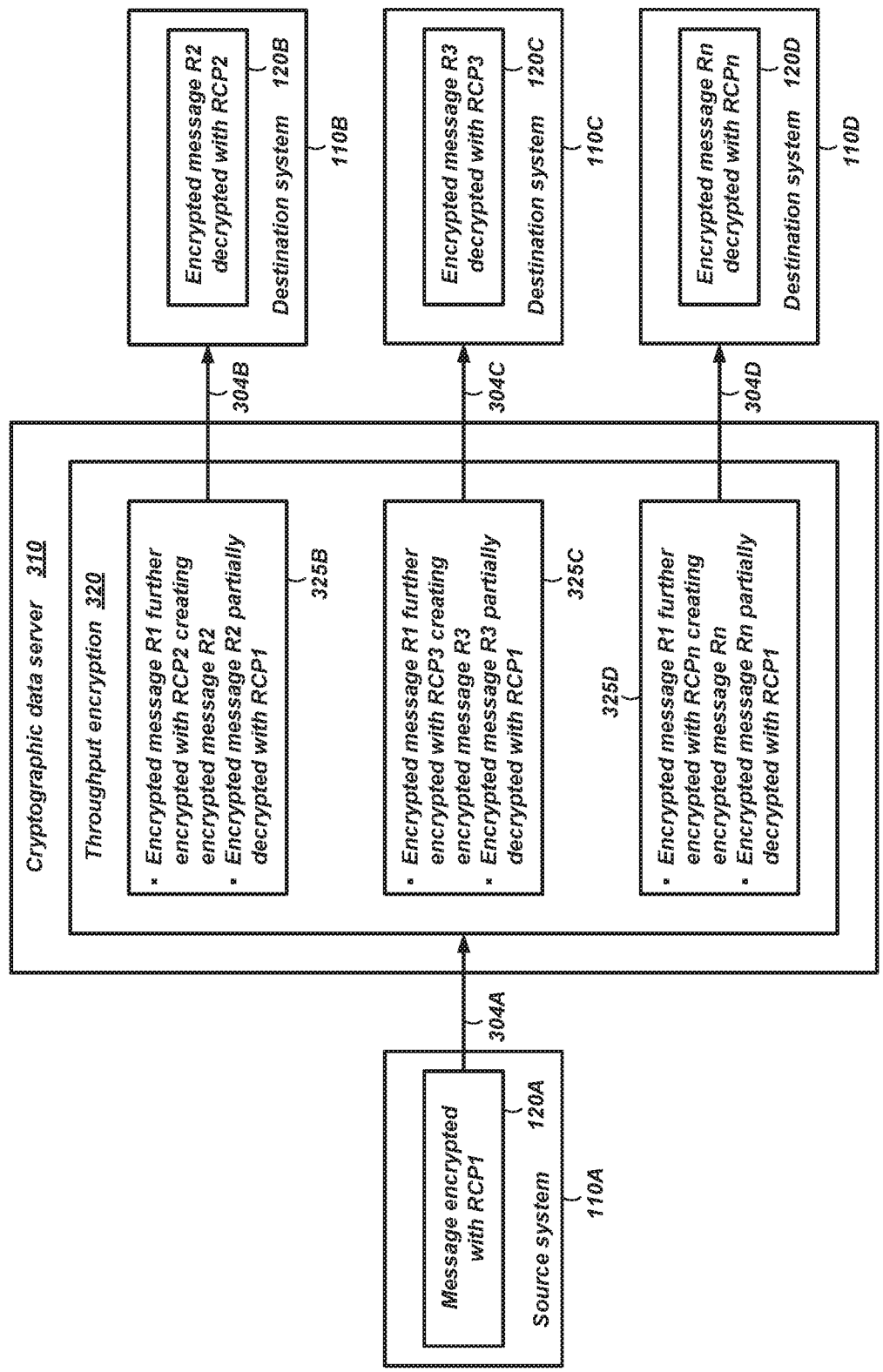
FIG. 3 is a block diagram illustrating communications of RCP encrypted messages through a data server.

FIG. 3 is a block diagram illustrating communications of RCP encrypted messages through a cryptographic data server 310. In the throughput mode, the cryptographic data server 310 becomes a central server for a trusted and authorized network. Message traffic transiting the cryptographic data server 310 never enters into an unencrypted state. Each endpoint, whether source system 110A or destination systems (110B, 110C, 110D), has a paired relationship with the cryptographic data server 310 such that the cryptographic data server 310 includes the same RCP or RCP pool as each and every endpoint to which it is paired. Thus, as one specific example in FIG. 3, the cryptographic data server 310 includes RCP1 matching RCP1 in the source system 110A. The cryptographic data server 310 also includes; RCP2 matching RCP2 in destination system 110B, RCP3 matching RCP3 in destination system 110C, and RCPn matching RCPn in destination system 110D. RCPs used for encryption between the source system 110A and the cryptographic data server 310 may also be referred to as source RCPs. RCPs used for encryption between the destination systems 110 and the cryptographic data server 310 may also be referred to as destination RCPs.

As shown on the left side of FIG. 3, a source system 110A encrypts 120A a plaintext message with RCP1 and transmits the encrypted message 304A to the cryptographic data server 310, along with metadata indicating information on destination system(s) 110 to receive the encrypted message and possibly what portions of the RCP(s) have been used.

The cryptographic data server 310 receives the encrypted message 304A and determines which destination systems 110 will receive the message. Then, for each destination system 110, throughput encryption 320 on the cryptographic data server 310 separately further encrypts the encrypted message 304A with a RCP paired with that destination system 110. This further encryption creates an intermediate encrypted message. Once the message has been further encrypted, the original encryption from RCP1 is removed by applying RCP1 to each of the intermediate encrypted messages. Thus, the message is at no point in this process left unencrypted. The commutative nature of a bitwise XOR operation ensures that after this process of applying RCP1 to each intermediate encrypted message, the encrypted message is encrypted only with the destination RCP for the particular destination system 110. Moreover, because of the commutative nature of the bitwise XOR operation, these two encryptions using the source RCP and the destination RCP may be performed in any order or as part of the same process.

The cryptographic data server 310 then sends each of the destination encrypted messages (304B, 304C, 304D) to their respective destination system (110B, 110C, 110D), respectively. These destination encrypted message (304B, 304C, 304D) may also include metadata indicating what portions of the destination RCP(s) were used in the intermediate encryption by the throughput encryption 320. Each destination system 110 decrypts 120 the message with its RCP that matches the RCP on the cryptographic data server 310 for that destination system 110.

Thus, in FIG. 3 the message is originally encrypted with RCP1 at the source system 110A. At process 325B, the throughput encryption 320 further encrypts the encrypted message 304A with RCP2 for destination system 110B, then applies RCP1 to the intermediate encrypted message to partially decrypt the message. At process 325C, the throughput encryption 320 further encrypts the encrypted message 304A with RCP3 for destination system 110C, then applies RCP1 to the intermediate encrypted message to partially decrypt the message. At process 325D, the throughput encryption 320 further encrypts the encrypted message 304A with RCPn for destination system 110C, then applies RCP1 to the intermediate encrypted message to partially decrypt the message. At this point, each destination encrypted message (304B, 304C, 304D) is sent to its respective destination system (110B, 110C, 110D) where it is fully decrypted with the RCP for that destination system 110.

An example of this throughput mode is given below for source system 110A (ie., endpoint A) sending a message to destination system 110B (i.e., endpoint B) and destination system 110C (i.e., endpoint C). In this example an 8-bit message and three 8-bit RCKs are used. Remember an RCK is a portion of a RCP that is the same length as the message to be operated on. The original plain text message and each of the three RCKs are defined as:

1100 1001=Plaintext
0101 0111 True Random Number A=RCK(A)
1100 0101 True Random Number B=RCK(B)
1001 1100 True Random Number C=RCK(C)

Table 1 illustrates each step of the process. Column 1 indicates a step number. Column 2 indicates the bytes as they exist for each step of the process for sending to destination B. Column 3 indicates the bytes as they exist for each step of the process for sending to destination C. Column 4 defines which RCK is being used or which encryption operation is performed. Column 5 indicates where the RCK is located or where the encryption operation is performed.

TABLE 1

Serial Application: RCK(Src), RCK(Dest), RCK(Src), RCK(Dest)

| | A to B | A to C | RCK/Operation | Location |
|---|---|---|---|---|
| 1 | 1100 1001 | 1100 1001 | PT – Plaintext | Source |
| 2 | 0101 0111 | 0101 0111 | RCK(Src) = RCK(A) | Source |
| 3 | 1001 1110 | 1001 1110 | CT1 = PT XOR RCK(Src) | Source |
| 4 | 1100 0101 | 1001 1100 | RCK(Dest) = RCK(B), RCK(C) | Data Server |
| 5 | 0101 1011 | 0000 0010 | CT2 = CT1 XOR RCK(Dest) | Data Server |
| 6 | 0101 0111 | 0101 0111 | RCK(Src) = RCK(A) | Data Server |
| 7 | 0000 1100 | 0101 0101 | CT3 = CT2 XOR RCK(Src) | Data Server |
| 8 | 1100 0101 | 1001 1100 | RCK(Dest) = RCK(B), RCK(C) | Destination |
| 9 | 1100 1001 | 1100 1001 | Restored PT = CT3 XOR RCK(Dest) | Destination |

At line 1, the original plaintext on source endpoint A is shown in columns 2 and 3. At line 2, RCK(A) on source endpoint A is generically defined as RCK(Src) and is shown as the same byte in both columns 2 and 3. At line 3, a first cyphertext CT1 is created by a bitwise XOR of the plaintext and RCK(Src). Lines 1-3 indicate data that resides on, or operations that are performed on, the source endpoint A. The encrypted bytes on line 3 are shown in bold font to indicate that they are the bytes that are transmitted to the secure data server.

Up to this point, although shown in both columns 2 and 3, there is only one plaintext message, one RCK(Src), one encryption operation performed, and one encrypted message sent no matter how many destinations the message may be going to. At lines 4-9, the operations diverge and columns 2 and 3 show the RCKs and operations that are separately performed for each of destination endpoint B and destination endpoint C.

Line 4 indicates the destination RCK (RCK(Dest)) on the data server for each of destination endpoint B and destination endpoint C. Thus, RCK(Dest) generically refers to both RCK(B) for destination endpoint B and RCK(C) for destination endpoint C. At line 5, a second cyphertext CT2 is created by a bitwise XOR of CT1 and RCK(Dst). Thus, at this point CT2 is different for destination endpoints B and C. Line 6 indicates the source RCK (RCK(Src)) is on the data server, which is the same RCK(Src) as on the source endpoint A.

At line 7, a third cyphertext CT3 is created by a bitwise XOR of CT2 and RCK(Src). This application of RCK(Src) partially decrypts the message by removing the original encryption from RCK(Src) and leaves CT3 as a message that is encrypted only with RCK(Dest). The encrypted bytes on line 7 are shown in bold font to indicate that they are the bytes that are transmitted to the destination endpoint.

Line 8 indicates RCK(Dest) is on the destination endpoint for each of destination endpoint B and destination endpoint C. Thus, RCK(B) on destination endpoint B is the same RCK(B) as on the data server and RCK(C) on destination endpoint C is the same RCK(C) as on the data server.

At line 9, the original plaintext message is restored at each of destination endpoint B and destination endpoint C by a bitwise XOR of CT3 and RCK(Dest). In other words, at destination B the plaintext message is restored by a bitwise XOR of CT3 and RCK(B) and at destination C the plaintext message is restored by a bitwise XOR of CT3 and RCK(C).

Note that at no time from original encryption until the message is decrypted by the final recipient does the message traffic ever enter into an unencrypted state. Throughput encryption effectively changes the original RCK to a newly selected truly random RCK while simultaneously destroying all RCKs as used. By using True Random Numbers from the RCP only once, there is no pattern for attack.

Figure 4:
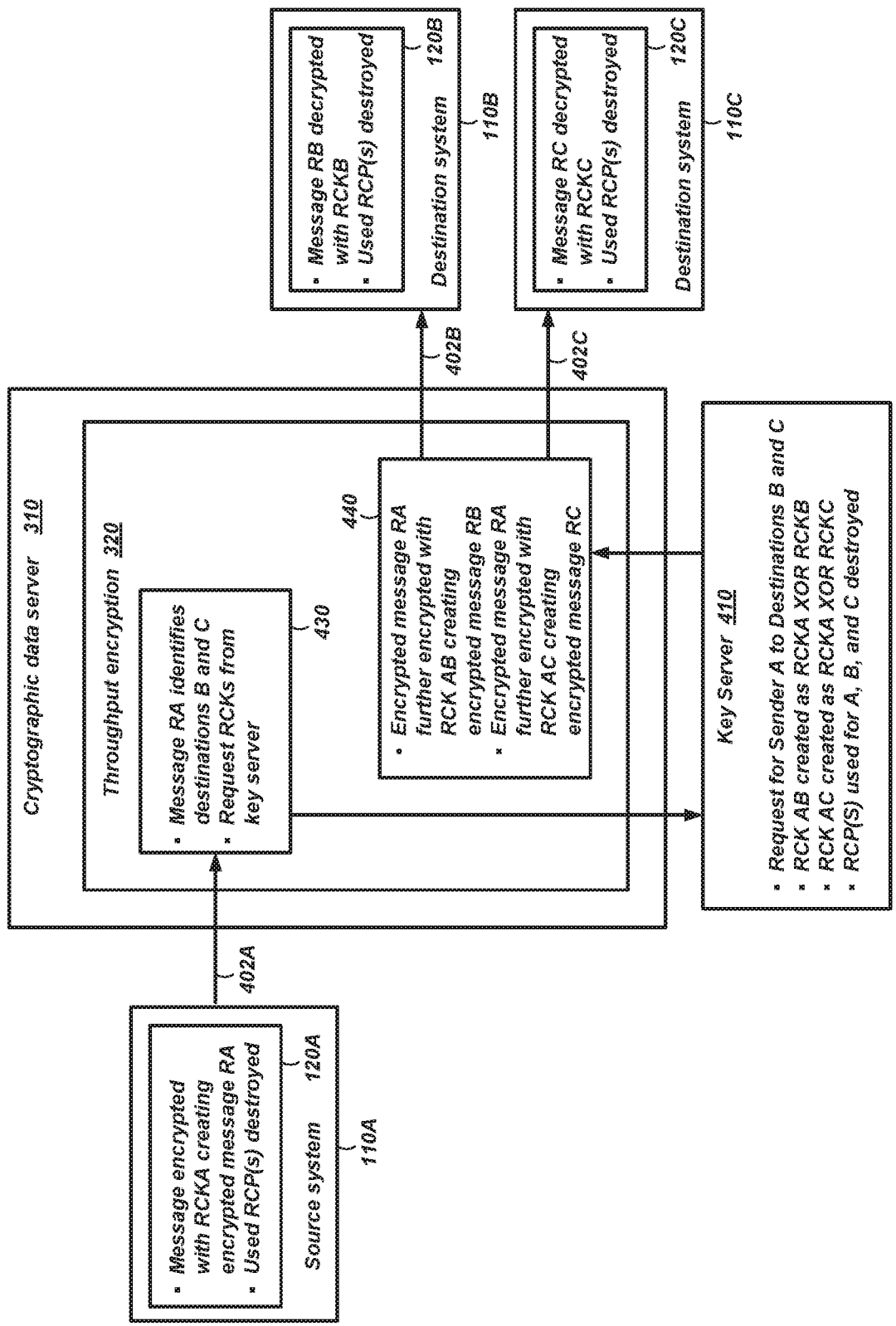
FIG. 4 is a block diagram including a key server and illustrating communications of RCP encrypted messages through a data server.

FIG. 4 is a block diagram including a key server 410 and illustrating communications of RCP encrypted messages through a cryptographic data server 310. FIG. 4 is similar to FIG. 3 except that the application of the RCKs is performed in a different order by taking advantage of the commutative nature of the bitwise XOR operation.

Two separate servers operating independently create the throughput process of FIG. 4. The cryptographic data server 310 receives the encrypted message 402A, requests a new Random Cypher Key (RCK) from the key server 410, further encrypts the encrypted message 402A and sends it on to one or more destination systems (110B, 110C) as destination encrypted messages (402B, 402C). Remember, an RCK is the portion of one or more RCPs used to encrypt a given transmission. The RCP refers to the stored unused True Random Numbers.

Thus, throughput is accomplished using two independent servers, one server to handle the message traffic and encryption the other server to handle RCP management. In creating a new RCK by combining the original sender RCK with that of the destination RCK into a single new RCK, several actions take place. First both RCKs that were on the key server 410 are destroyed leaving only the new combined RCK. This new combined RCK can never be returned to its original separate parts. When the new combined RCK is applied to the encrypted message, the original source RCK is canceled out as it is replaced by the destination RCK. The source RCK is destroyed on the source system 110A when the message is originally transmitted and destroyed on the key server 410 when the combined RCK is created. In addition, any destination RCKs used on the key server 410 are destroyed when the combined RCK is created. This scenario leaves the only possible decryption with the sole remaining functional RCKs at each of the destination system 110. Moreover, in embodiments where the combined RCK is provided from a key server 410, the cryptographic data server 310 never needs to posses the key(s) necessary to decrypt the original message.

In more detail, at process 120A the source system 110A encrypts the message with RCKA, creating encrypted message RA. Any RCPs used to create RCKA are destroyed on the source system 110A.

Process 430 in the throughput encryption 320 receives message RA encrypted with RCKA and also determines, from included metadata, that destinations B and C are meant to receive the message. The encrypted message RCKA includes metadata identifying the source system 110A, any destination systems (110B, 110C), the message length, and may include identifiers to indicate what portion of any RCPs were used to define the RCK that was used in the encryption. Process 430 then requests a combined RCK for each destination system 110 from the key server 410. This request would include information for identifying the source system 110A, any destination systems (110B, 110C), the message length, and possibly identifiers to indicate what portion of any RCPs were used to define the RCKA that was used in the encryption. The key server 410 then creates combined RCK AB as on XOR of RCKA and RCKB and combined RCK AC as on XOR of RCKA and RCKC. After creating the combined RCKs, the key server 410 destroys any RCPs used for creating the combined RCKs, which would include RCPs associated with the source system 110A and RCPs associated with the destination systems (110B, 110C). The key server 410 then sends combined RCK AB and combined RCK AC back to the cryptographic data server 310. Each combined RCKs includes metadata indicating the appropriate destination system 110, the message length, and may include identifiers to indicate what portion of any destination RCPs on the key server 410 were used to create the combined RCKs. The combined RCKs may also be referred to as intermediate RCKs.

Process 440 further encrypts message RA with RCK AB to create destination encrypted message RB and further encrypts message RA with RCK AC to create destination encrypted message RC. The key server 410 then sends these destination encrypted messages (RB, RC) to their corresponding destination system (110B, 110C). Each destination encrypted message (RB, RC) includes metadata for the destination system (110B, 110C), the message length, and identifiers to indicate what portion of any destination RCPs on the key server 410 were used to create the combined RCKs.

On destination system 110B, process 120B receives destination encrypted message RB, uses the metadata to define RCKB within the RCPs stored on destination system 110B and decrypts message RB with RCKB. Any RCPs used to define RCKB are destroyed. Similarly, on destination system 110C, process 120C receives destination encrypted message RC, uses the metadata to define RCKC within the RCPs stored on destination system 110C and decrypts message RC with RCKC. Any RCPs used to define RCKC are destroyed.

An example including further detail is given below for a source system 110A (i.e, endpoint A) sending a message to destination system 110B (i.e., endpoint B) and destination system 110C (i.e., endpoint C). This example, illustrated in Table 2, uses the same plaintext message and RCKs as the example above to illustrate that the same result is achieved even though the RCKs are combined in a different manner.

In this example an 8-bit message and three 8-bit RCKs are used. Remember an RCK is a portion of a RCP that is the same length as the message to be operated on. As with the example above, the original plain text message and each of the three RCKs are defined as:

1100 1001=Plaintext
0101 0111 True Random Number A=RCK(A)
1100 0101 True Random Number B=RCK(B)

In addition, the combined RCKs that are created on the key server 410 RCK(AB) and RCK(BC) are defined as:

0101 0111 RCK(A)
1100 0101 RCK(B)
1001 0010 RCK(AB)=RCK(A) XOR RCK(B)
0101 0111 RCK(A)
1001 1100 RCK(C)
1100 1011 RCK(AC)=RCK(A) XOR RCK(C)

TABLE 2

Apply Combined Key: RCK(Src), RCK(Comb), RCK(Dest)

| | A to B | A to C | RCK/Operation | Location |
|---|---|---|---|---|
| 1 | 1100 1001 | 1100 1001 | PT – Plain Text | Source |
| 2 | 0101 0111 | 0101 0111 | RCK(Src) = RCK(A) | Source |
| 3 | 1001 1110 | 1001 1110 | CT1 = PT XOR RCK(Src) | Source |
| 4 | 1001 0010 | 1100 1011 | RCK(Comb) = RCK(AB), RCK(AC) | KS and DS |
| 5 | 0000 1100 | 0101 0101 | CT 2 = CT1 XOR RCK(Comb) | Data Server |
| 6 | 1100 0101 | 1001 1100 | RCK(Dest) = RCK(B), RCK(C) | Destination |
| 7 | 1100 1001 | 1100 1001 | Restored PT = CT2 XOR RCK(Dest) | Destination |

At line 1, the original plaintext on source endpoint A is show in columns 2 and 3. At line 2, RCK(A) on source endpoint A is generically defined as RCK(Src) and is shown as the same byte in both columns 2 and 3. At line 3, a first cyphertext CT1 is created by a bitwise XOR of the plaintext and RCK(Src). Lines 1-3 indicate data that resides on, or operations that are performed on, the source endpoint. The encrypted bytes on line 3 are shown in bold font to indicate that they are the bytes that are transmitted to the secure data server.

Up to this point, although shown in both columns 2 and 3, there is only one plaintext message, one RCK(Src), one encryption operation performed, and one encrypted message sent no matter how many destinations the message may be going to. At lines 4-7, the operations diverge and columns 2 and 3 show the RCKs and operations that are separately performed for each of destination endpoint A and destination endpoint B.

Line 4 indicates the combined RCK (RCK(Comb)). When an encrypted message is received at the data server, it includes metadata indicating the source endpoint, and data endpoints, as well as information to define which parts of a RCP are to be used to define an RCK for this message for each of the source endpoint, destination endpoint A, and destination endpoint B. This metadata is passed from the cryptographic data server 310 to the key server 410. The key server 410 maintains RCPs that are copies of the RCPs at each of the source endpoints and destination endpoints. Thus, in this example, the key server 410 uses the metadata to select RCK(A) from RCP pool A, select RCK(B) from RCP pool B, and select RCK(C) from RCP pool B. The key server 410 also uses the metadata to combine RCK(A) and RCK(B) into RCK(AB) and combine RCK(A) and RCK(C) into RCK(AC). The key server 410 then transmits the combined RCKs RCK(AB) and RCK(AC) back to the key server 410 and destroys the individual RCKs RCK(A), RCK(B), and RCK(C) on the key server 410 as well as the combined RCKs RCK(AB) and RCK(AC) on the key server 410.

These combined RCKs are defined generically as RCK (Comb). Thus, RCK(Comb) on the cryptographic data server 310 generically refers to both RCK(AB) for destination endpoint B and RCK(AC) for destination endpoint C. At line 5, a second cyphertext CT2 is created by the data server by a bitwise XOR of CT1 and RCK(Comb). Thus, at this point CT2 is different for destination endpoints B and C. The encrypted bytes on line 5 are shown in bold font to indicate that they are the bytes that are transmitted to the destination endpoints B and C. After transmission, RCK(AB) and RCK(AC) are destroyed.

Line 6 indicates RCK(Dest) is on the destination endpoint for each of destination endpoint B and destination endpoint C. Thus, RCK(B) on destination endpoint B is the same RCK(B) as on the key server 410 and RCK(C) on destination endpoint C is the same RCK(C) as on the key server 410.

At line 7, the original plaintext message is restored at each of destination endpoint B and destination endpoint C by a bitwise XOR of CT2 and RCK(Dst). In other words, at destination B the plaintext message is restored by a bitwise XOR of CT2 and RCK(B) and at destination C the plaintext message is restored by a bitwise XOR of CT2 and RCK(C).

Note that at no time from original encryption until the message is decrypted by the final recipient does the message traffic ever enter into an unencrypted state. Throughput encryption effectively changes the original RCK to a newly selected truly random RCK while also destroying all RCKs as used. By using True Random Numbers from the RCP only once, there is no pattern for attack. Moreover, the data server never has access to the original RCPs or RCKs for any of the endpoints, it only holds the combined RCKs used for the current message. These combined RCKs are destroyed after use. Conversely, the key server never has access to the message in any of its plaintext or cyphertext forms.

Figure 5:
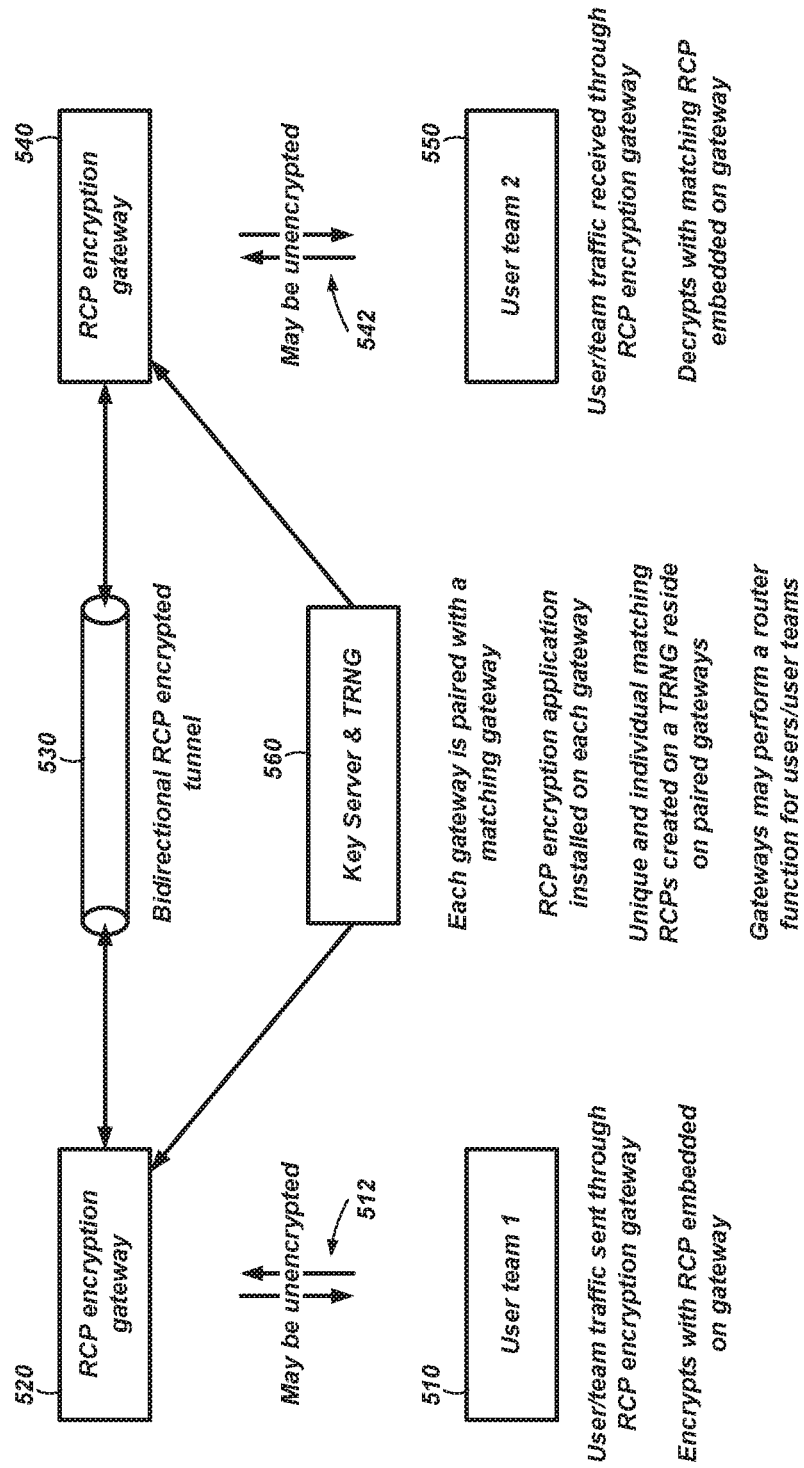
FIG. 5 is a block diagram illustrating communications of messages through paired routers including RCP cryptography.

FIG. 5 is a block diagram illustrating communications of messages through one or more routers, servers, or combinations thereof including RCP cryptography. For ease of discussion, the system in FIG. 5 may be referred to as Router-to-Router (R2R). However, it should be understood that this system may use routers, servers, gateways, or other suitable devices for communicating with multiple clients, encrypting/decrypting client message traffic and sending/receiving encrypted messages through a bi-directional RCP encrypted tunnel 530. To emphasize this flexibility, these systems are shown as RCP encryption gateways (520A, 520B) in FIG. 5, but may be referred to as routers in the description.

Embodiments using Router-to-Router hardware and/or software as a specialized solution for select applications where message traffic is being exchanged between many users in two (2) distributed locations. Similarly, embodiments using servers on one or both ends include hardware and/or software as a specialized solution for select applications where server resources are used at one or both of the distributed locations. Encryption is applied at each router as traffic enters or departs. The routers become single endpoints, paired exclusively with each other and shared by many on either end. This system may be more appropriate for operations where both ends are contained within a secure environment because all traffic between senders and their corresponding router may be in plaintext and subject to exploitation if intercepted.

R2R embodiments may be used for group collaboration under tightly controlled circumstances. Each character of every message is uniquely and individually encrypted at the router (520A, 520B) using a RCP containing True Random Numbers supplied either dynamically or physically installed. Every RCP is destroyed as it is consumed, never to be used again. R2R is a simplified option for collaborative and well controlled environments with several to many participants at either end.

As illustrated in FIG. 5, a server 560 with TRNG hardware 560 distributes paired RCPs to each RCP encryption gateway (520A, 520B). Thus, a router (520A, 520B) may be considered similar to an endpoint as discussed below in combination with FIGS. 7 through 9. In other words, a router (520A, 520B) performs its normal function of communication with various user endpoints within the controlled environment along with RCP encryption functions. As a result, in some embodiments, this user endpoint (510, 550) to router (520A, 520B) traffic may be unencrypted. However, the RCP enabled routers (520A, 520B) communicate with each other with RCP encrypted messages containing messages from any of the various user endpoints on either end.

In further detail, and as a specific example of traffic flowing left to right, user team 1 510 includes one or more transmitting clients, which send unencrypted messages 512 to RCP encryption gateway 520A. A RCP encryption application installed on the RCP encryption gateway 520A encrypts the messages with RCPs stored on the RCP encryption gateway 520A and transmits the encrypted messages through the bi-directional RCP encrypted tunnel 530.

On the receiving side, a RCP encryption application installed on the RCP encryption gateway 520B decrypts the messages with RCPs stored on the RCP encryption gateway 520B that correspond to the RCPs on the RCP encryption gateway 520A. These decrypted messages 542 are then routed to the proper receiving clients in user team 2 550.

Figure 6:
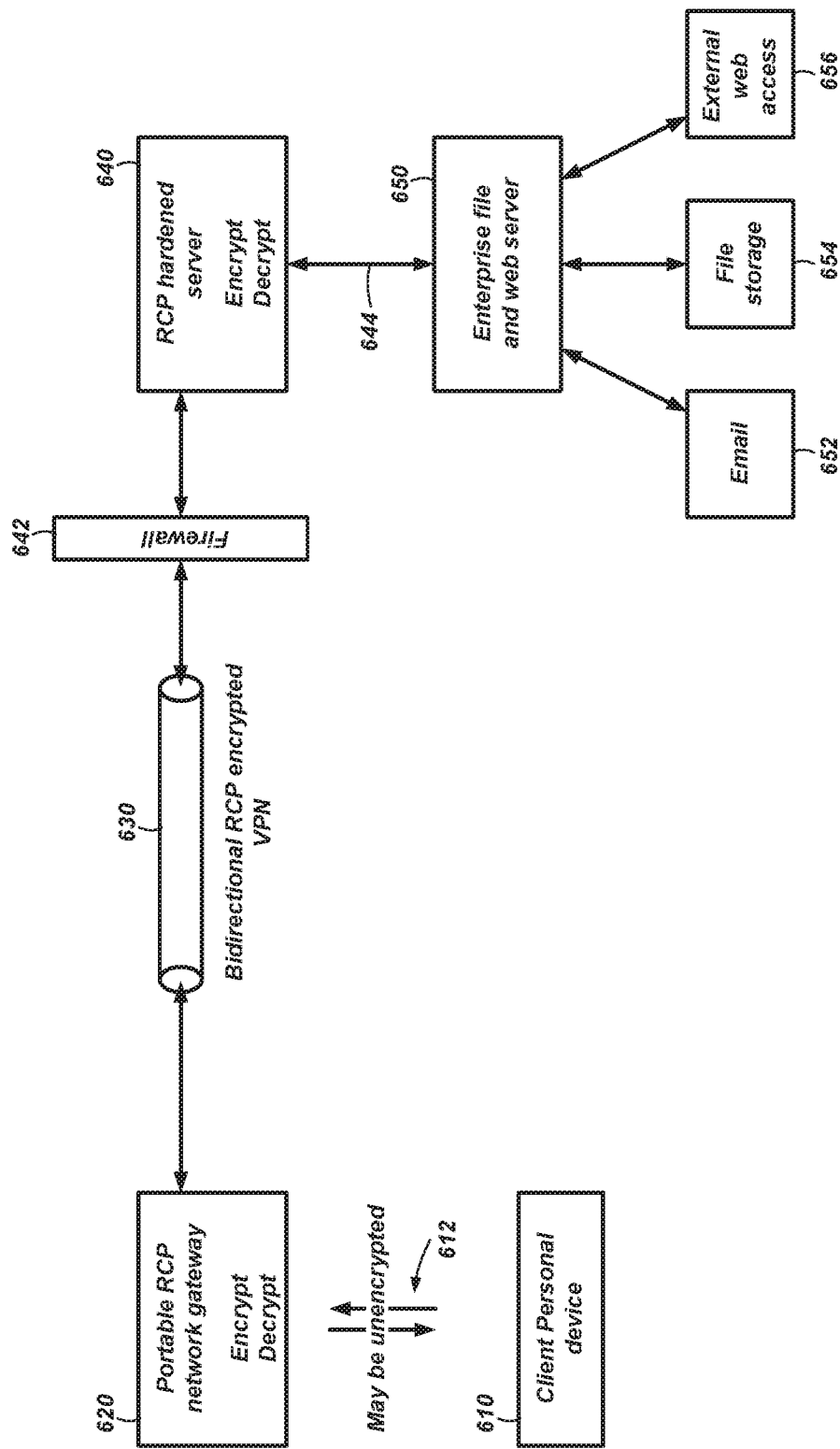
FIG. 6 is a block diagram illustrating communications of messages between a client device and a server using a secure private network including RCP cryptography.

FIG. 6 is a block diagram illustrating communications of messages between a client device 610 and a server 640 using a secure private network including RCP cryptography. FIG. 6 may be thought of as a specific implementation of the more general system in FIG. 5. In FIG. 6, a client personal device 610 sends and receives unencrypted messages 612 to a portable network gateway 620. The portable network gateway 620 encrypts and decrypts these messages with RCPs. The encrypted form of the messages are communicated through a secure private tunnel 630, which may be configured as a RCP encrypted tunnel for a Virtual Private network (VPN). On an enterprise side, a firewall 642 may be included between the secure private tunnel 630 and a RCP hardened server 640.

The RCP hardened server 640 encrypts and decrypts the messages with RCPs corresponding to those used on the portable network gateway 620, then sends the unencrypted message 644 to an enterprise server 650, which may distribute the messages as needed to devices and/or services, such as, for example, Email 652, file storage 654, and external web access 656.

The portable network gateway 620 may be configured as a small portable device configured to communicate with the user's client personal device 610, which may be, for example, a cellphone, tablet, laptop computer, computer, or other suitable device. Communication between the client personal device 610 and the portable network gateway 620 may be any suitable protocol and connection such as, for example, Wi-Fi, Ethernet Local Area Network (LAN), BLUETOOTH®, ZIGBEE®, and universal serial bus.

The portable network gateway 620 encrypts traffic before passing it on to the internet through any suitable connection, such as, for example Wi-Fi or LAN, thus opening the secure private tunnel 630 back to the enterprise network. As encryption is performed the RCPs that are used on each end are destroyed after they are used.

To distribute RCPs, the RCP hardened server 640 may be configured with a TRNG (not shown) to generate RCPs or may be coupled to a TRNG to place RPCs on the RCP hardened server 640. The portable network gateway 620 may be coupled to the RCP hardened server 640 to download the corresponding RCPs on to the portable network gateway 620. Alternatively, the portable network gateway 620 may be coupled to the TRNG to download the same RCPs on to the portable network gateway 620 that were transferred to the RCP hardened server 640.

Figure 7:
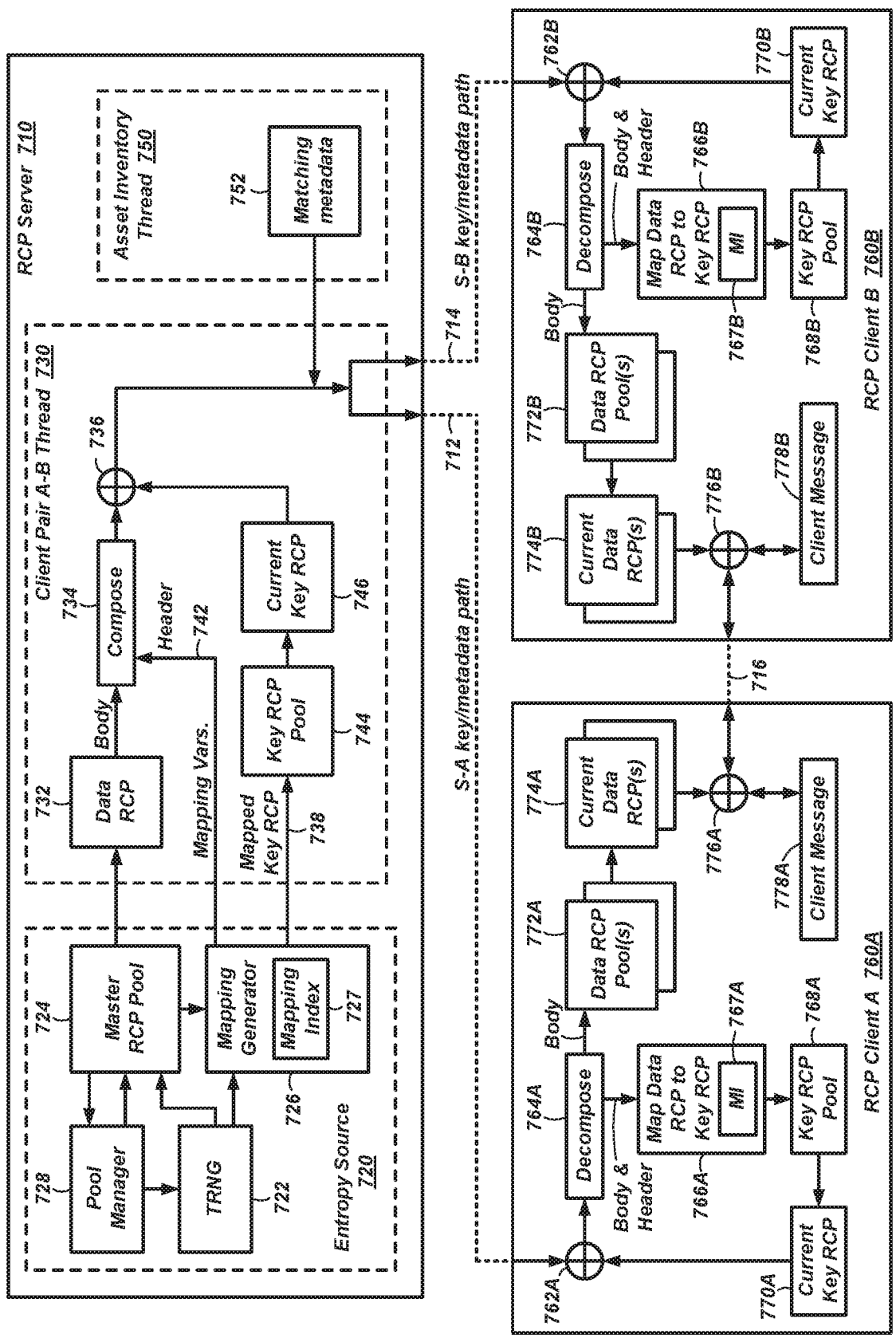
FIG. 7 is a block diagram illustrating a system including a RCP server and RCP clients for message encryption.

FIG. 7 is a block diagram illustrating a system including a RCP server 710, and two RCP clients (760A and 760B) for message encryption. FIG. 7 is used as one example of how a RCP server and RCP clients may interact to give additional details. Other variations of RCP servers, TRNG hardware devices, and RCP client, and the interactions therebetween may be used in various embodiments of the present disclosure.

The RCP server 710 may include various processes, which may run in separate threads on the RCP server 710. An entropy source 720 may be used to generate random numbers and manage a master RCP pool 724. One or more RCP client pair threads 730 (e.g., RCP client pair A-B thread 730 is shown in FIG. 7) may be used to generate Key RCPs and Data RCPs. One or more asset inventory threads 750 may be included to manage the RCPs for the various RCP client pairs and manage matching metadata 752 for the various RCP client pairs.

For ease of description, FIG. 7 is a simplified depiction of an overall system. A person of ordinary skill in the art will recognize that there may be many RCP clients in a system according to the present disclosure. Moreover, many different RCP clients may wish to communicate. In systems of the present disclosure, communication occurs between a pairing of RCP clients as well as pairing between the RCP server 710 and each RCP client 760. For example, perhaps there are four RCP clients; client A, client B, client C, and client D. In such a system, the RCP server 710 may need to manage Data RCPs and Key RCPs for a variety of client pairs. For brevity, only the A-B pairing between RCP client A 760A and RCP client B 760B is discussed herein. However, as a non-limiting example, there may be other client pairing such as A-C, A-D, B-C, B-D, and C-D. All of these various pairing would be managed by the RCP server 710 and each separate pairing may have its own RCP client pair thread running on the RCP server 710.

In the example of FIG. 7, the RCP server 710 conveys RCPs and RCP metadata 752 on an S-A key/metadata path 712 between the RCP server 710 and RCP client A 760A.

Similarly, the RCP server 710 conveys RCPs and RCP metadata on an S-B key/metadata path 714 between the RCP server 710 and RCP client B 760B. RCP client A 760A and RCP client B 760B send encrypted data back and forth across a communication path 716. The communication paths (712, 714, and 716) may use any suitable communication interfaces and protocols, such as, for example, BLU-ETOOTH® wireless signals, 802.1 a/b/g/n type wireless signals, cellular phone signals, TCP/IP, FTP, and HTTP.

The entropy source 720 includes the master RCP pool 724 that holds a collection of generic RCPs for use by the various RCP client pair threads to build and transmit Key RCPs 738 and Data RCPs 732 to the RCP client pair (760A, 760B). A pool manager 728 manages pool requests from the master RCP pool 724 to keep the master RCP pool 724 relatively full. For example, if the master RCP pool 724 falls below a predetermined threshold of available RCPs, the master RCP pool 724 may send a request for additional RCPs to the pool manager 728. In some embodiments, request may come from other sources, such as, for example, a Key RCP pool 744 in the client pair A-B thread 730, the RCP client pair (760A 760B) it they are running low on Data RCPs or Key RCPs, or the asset inventory thread 750.

A True Random Number Generator (TRNG) 722 is a hardware device, and associated software if needed, used to generate truly random numbers from an unpredictable quantum or non-quantum physical process. Quantum examples of these processes include nuclear decay, photons transmitted through a partially transparent mirror, and fluctuations in vacuum energy. Non-quantum examples include thermal noise, clock drift, and RF noise. The TRNG 722 delivers random numbers to the master RCP pool 724 to populate RCPs with random numbers. The TRNG 722 may also deliver random numbers to a mapping generator 726 for building a mapping index 727, as explained more fully below.

Turning to the client pair A-B thread 730 (and any other client pair threads not shown), the master RCP pool 724 delivers a RCP to a Data RCP 732. The master RCP pool 724 also delivers the same RCP to the mapping generator 726 where the RCP is mapped into a Key RCP. A mapped Key RCP 738 is delivered to the Key RCP pool 744. In addition, a unique Key RCP identifier 742 used to define which Key RCP from the Key RCP pool 744 is to be used is sent to a compose module 734. The compose module 734 takes the Data RCP 732 as a message body and adds the unique Key RCP identifier 742 as a header. Details of this process are explained more fully below.

An encryption process 736 encrypts the composed Data RCP 732 using a current Key RCP 746 from the Key RCP pool 744. The encryption process 736 is illustrated in FIG. 7 as a simple bitwise XOR. However, other embodiments may include any suitable symmetric encryption process. After encryption, the resulting RCP is transmitted to both RCP client A 760A and RCP client B 760B.

RCP client A 760A and RCP client B 760B operate in a substantially similar manner and include the same elements. As a result, description of the RCP clients 760 will refer to the generic elements without the designator "A" or "B" except where needed. The RCP cipher is received at a decryption process 762. The decryption process 762 uses a current Key RCP 770 to decrypt the RCP and send it to a decompose module 764. The decompose module 764 separates the body portion and sends it to one or more Data RCP pools 772. In some embodiments, separate pools are maintained for send data and receive data. For the RCP clients 760 to properly encrypt and decrypt messages, the RCP clients 760 stay in synchronization. Moreover, some RCP clients 760 may be able to communicate full duplex sending and receiving encrypted messages simultaneously. Thus, to facilitate this complex traffic, each RCP client 760 may maintain a send Data RCP pool 772 and a receive Data RCP pool 772. In such embodiments, the Data RCPs in the send Data RCP pool 772 on one RCP client 760 would match up with the Data RCPs in the receive Data RCP pool 772 and vice versa. Coherence of these various RCPs and RCP pools between the RCP clients 760 may be managed by the asset inventory thread 750 and matching metadata 752 that is sent to the various RCP clients 760.

The decompose module 764 also sends the decrypted RCP (both the body and the header) to a mapping module 766. The mapping module 766 performs a process similar to that used by the mapping generator 726 in the RCP server 710 to convert the Data RCP to a Key RCP. This process is determined by variables in the header and is explained more fully below. The resulting Key RCP is sent to the Key RCP pool 768 for future use. The mapping module 766 may also send the body to one of the Data RCP pools 772. The mapping module 766 may also use the decrypted RCP from the decompose module 764 to generate a new mapping index 767 to replace the current mapping index 767 or modify the current mapping index 767.

For secure communication between the RCP clients 760, a current Data RCP 774 is drawn from the appropriate Data RCP pool 772. For example, client A 760A uses a current send Data RCP 774A and an encryption process 776A to encrypt a client message 778A. The encrypted message is sent to client B. Client B uses a current receive Data RCP 774B and a decryption process 776B to generate a decrypted client message 778B. As discussed earlier, in this example the encryption process 776A and decryption process 776B are illustrated as a simple bitwise-XOR and, as a result, can be the same process on both clients. In embodiments using a different type of symmetric encryption, the encryption process and decryption process may be different.

In the reverse direction, client B 760B uses a current send Data RCP 774B and an encryption process 776B to encrypt a client message 778B. The encrypted message is sent to client A. Client A uses a current receive Data RCP 774A and a decryption process 776A to generate a decrypted client message 778A. In both directions, a Data RCP is only used once and is destroyed after use.

System Interaction

Now, a more full system interaction discussion will add additional details concerning RCP management and communications between the RCP server 710 and the RCP client pair (760A 760B). The concept is to provide the clients 760 with matching Data RCPs that they can freely dip into to do standard symmetrical encryption. As stated earlier, in order to avoid certain collision issues, some embodiments may maintain separate Data RCPs for sending and receiving data. The Sending Data RCP of one client pairs with the Receiving Data RCP of the other client.

Metadata may be exchanged between the RCP server 710 and each of the clients 760 independent of the client pairing. This metadata exchange may require additional RCP Pools even before a pairing is established. The use of this link is quite limited, but may be needed in some embodiments. For example, if there were no communications prior to the client pairing, the clients would not know how to request a client pairing.

The following will discuss bootstrapping into a client pairing, then to a client pair startup, then to client communications.

At client installation, each client 760 is loaded with sufficient RCP data to establish a pairing with the RCP server 710, requiring no unencrypted communication. No predefined Mapping Parameters are required. This means the current Key RCP 770 should be loaded and the Key RCP Pool 768 should contain one item. The extra RCP is because the RCP server 710 will be sending RCPs with headers, which is larger than just the RCP. The output of the Data RCP decryption process 762 can be redirected to any RCP Pool (receive 772, send 772, key RCP pool 768) or the mapping index 767 using metadata in the header.

Server Startup & Initialization

The entropy source 720 is started to begin populating the master RCP pool 724. This thread uses the TRNG 722 to generate random numbers for each element of each RCP and starts building the master RCP pool 724. The pool manager 728 monitors the master RCP pool 724 to throttle creation of RCPs when the master RCP pool 724 is near full.

User Logon

A listener thread (not shown) is started on the RCP server 710 to monitor various clients 760 for individual user logins. A user thread (not shown) on the RCP server 710 is started, which handles communications between the individual users on the clients 760 and the RCP server 710. The RCP server 710 sends a new RCP directed to a Key RCP pool 768 for a server/client link. The RCP server 710 loops, creating new Key RCPs until the desired level of Key RCPs in the Key RCP pool 768 for the server/client link (712, 714) is achieved. This link is used for all communications pre-pairing as well as any communication associated with the individual client, as opposed to the pair.

Note that this server/client link is a thread that is not shown in FIG. 7. It is similar to the client pair A-B thread 730, but used to maintain a pairing for RCP management and secure communication between the RCP server 710 and an individual client 760.

User Request for Pairing

A client 760 may request pairing with any other logged in client 760. From the request, the RCP server 710 starts the client pair A-B thread 730. In addition, under direction from the RCP server 710, each client 760 starts its user pair thread for this specific client pairing. While not shown in FIG. 7, a client 760 may be communicating with multiple other clients 760 and would maintain a client pair thread for each client 760 it is communicating with.

The RCP server 710 sends a new RCP directed to the Key RCP pool (768A, 768B) on both clients (760A, 760B). Metadata in the header of the RCP includes randomly selected mapping parameters directed to seed the Data RCP pools (772A, 772B). This process is repeated until a desired level of RCPs in the Key RCP pools (768A, 768B) is reached.

The RCP server 710 sends a new RCP directed to a Data RCP Pool (772A, 772B) for both clients, metadata in the new RCP includes randomly selected mapping parameters directed to seed the Data RCP Pools (772A, 772B). This process is repeated until a desired level of RCPs in the Data RCP pools (772A, 772B) is reached.

The RCP server 710 starts the asset inventory thread 750, which uses metadata to force the client RCP Pools (key 768, send 772, and receive 772) and mapping parameter buffers (not shown) to match. The clients 760 initialize the user pair communications link 716 using any suitable communication interface and protocol.

Mapping parameters are stored in a buffer associated with each Data RCP Pool 772 under the direction of the RCP server 710. New parameters come with each Data RCP received but are not necessarily associated with that pool. The target is decided by the asset inventory thread 750. The parameters may be chosen in a First-In-First-Out (FIFO) manner. If certain errors are encountered the mapping parameters could conceivably run low in which case the asset inventory thread 750 may direct the priority be given to replenishment. The same general comment applies to Key RCP Pools 768 as well. There is a great deal of asymmetry of bandwidth in this setup. Most of the bandwidth between the RCP server 710 and the client 760 is consumed in the RCP movement while all other communications are just small amounts of metadata.

User Pair Communications

Communication between clients 760 may be full duplex. (Meaning both users can send at the same time without collision, if the digital protocol allows it.) Assuming both clients 760 are in synch and client A 760A is sending a client message 778A to client B 760B, then when client A 760A has depleted the current sending Data RCP 774A it simply picks up the next sending Data RCP 774A from the sending Data RCP Pool 772A and continues until done with the current client message 778A or the sending block is full.

When client B 760B receives the block it does the same, but getting the next receiving Data RCP 774B from the receiving Data RCP Pool 772B. If any loss of synchronization occurs, it may be picked up by the GUID, or other RCP identifier, in the block header.

Mapping Data RCPs to Key RCPs

Figure 8:
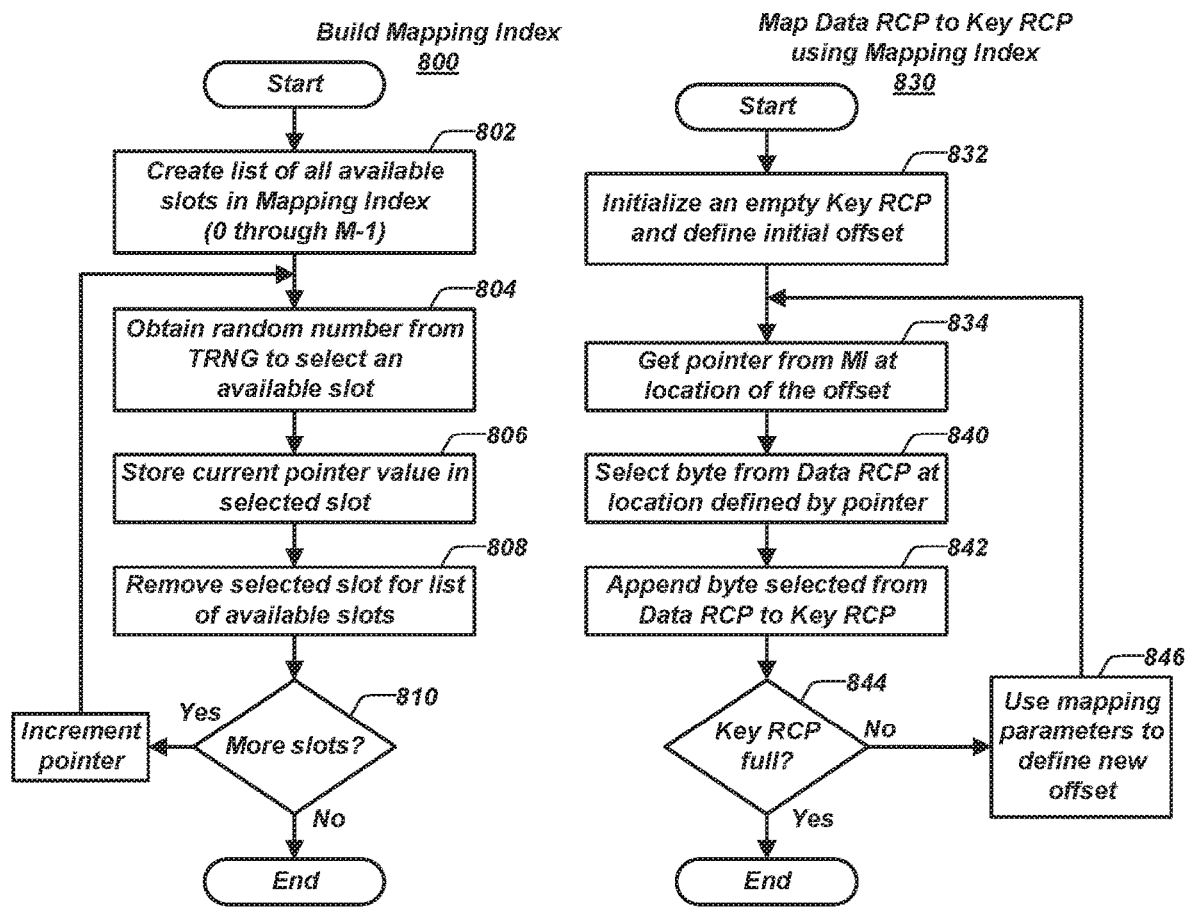
FIG. 8 illustrates processes for generating a mapping index, mapping a Data RCP to a Key RCP using the mapping index, and directly mapping a Data RCP to a Key RCP.

FIG. 8 illustrates processes for generating a mapping index, mapping a Data RCP to a Key RCP using the mapping index, and directly mapping a Data RCP to a Key RCP.

Figure 9:
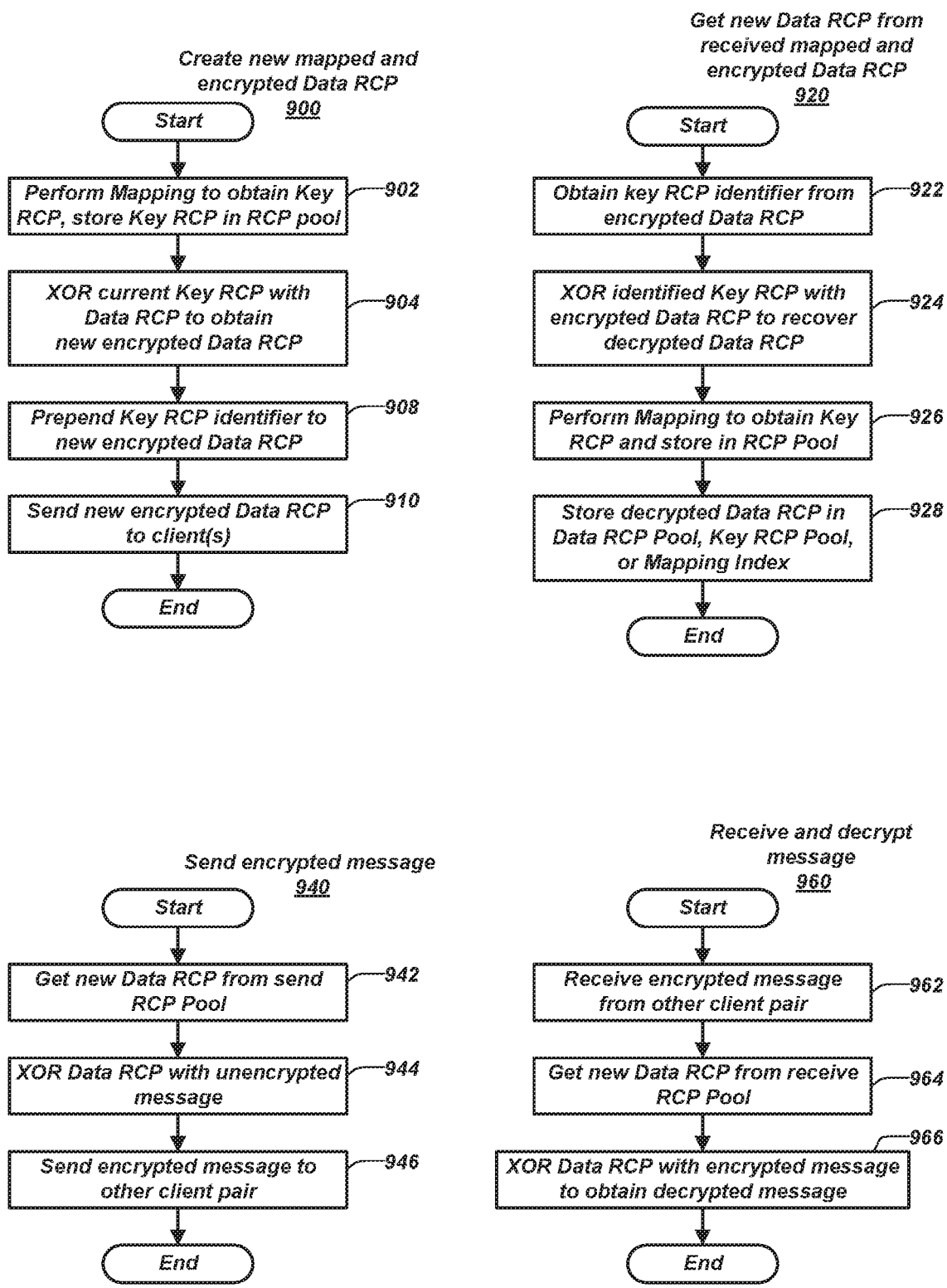
FIG. 9 illustrates processes for creating a new RCP on the RCP server, generating a new RCP from an encrypted RCP on a client, sending an encrypted message, and decrypting a received message.

FIG. 9 illustrates processes for creating a new RCP on the RCP server 710, generating a new RCP from an encrypted RCP on a client, sending an encrypted message, and decrypting a received message.

These figures will be discussed together and in combination with FIG. 7 to fully discuss example embodiments of the mapping processes. In general, the mapping processes apply a pad mapping to a Data RCP using each element of the Data RCP once in a predetermined non-sequential order to develop a Key RCP.

In general, Data RCPs have a total key size N (e.g., in bytes). The mapping index may have a size M>=N (measured in number of pointers). The mapping index should be selected to have a total index size M that is a prime number and the size of the pointers in the mapping index should be selected such that the pointers can represent any number 0 through N−1.

The mapping index can be used to adequately randomize Data RCPs into Key RCPs as long as the mapping index is replaced occasionally. If the mapping index is used many times, even with random addressing methods to select elements of the mapping index, a pattern may emerge in the correlation between the Data RCP and the Key RCP. By making the size of the mapping index prime and using one of many different random addressing methods, the pad mapping process may take different paths through the mapping index for each mapping of a Data RCP to a Key RCP.

Since mapping index replacement may be more bandwidth intensive than moving RCPs, the lifetime of a mapping index before replacement is needed may be extended by using the random addressing methods to take the different paths through the mapping index. As one non-limiting example, a random start location and random step size through the mapping index may be included with an encrypted Data RCP.

FIG. 8 includes a process 800 for building a mapping index. At process 802, a list is created for all the available slots in the mapping index. A pointer value is also initialized to 0 at process 802.

At process 804, a random number is obtained from the TRNG 722 (FIG. 7). This random number is used to select a slot in the mapping index. Thus, for this process the TRNG 722 may be configured to produce random numbers between 0 and M−1.

At process 806, the current pointer value (0 for the first time through the loop) is stored in the slot selected by the random number from the TRNG 722.

At process 808, the currently selected slot is removed from the list of available slots.

At process 810, a decision is performed to determine whether all of the slots in the mapping index have been filled. If so, the process 800 ends. If not, process 804 increments the pointer and the process 800 loops back to process 804 to populate another randomly selected slot with the current pointer value.

FIG. 8 also includes a process 830 for mapping a Data RCP to a Key RCP using the mapping index. For this mapping process, a random addressing method is defined for determining a random path through the mapping index.

As one non-limiting example, an initial location and a step size may be provided to form a process for walking through all locations of the Key RCP. Thus, a step size may be selected that is mutually prime with the size of the mapping index that is being stepped through. This can be accomplished by choosing a size for the mapping index that is prime, or by carefully choosing a step size that is mutually prime with the size of the mapping index (step sizes that are prime themselves, for example).

Many other random addressing methods for the mapping index may be defined for embodiments of the present disclosure as long as mapping parameters for performing the addressing method can be passed between the two nodes that need to follow the same path through the mapping index for any specific mapping of a Data RCP to a Key RCP.

At process 832, an empty Key RCP is initialized. Also, the mapping parameters are used to define an offset into the mapping index as the initial location to begin the mapping process 830.

At process 834, a RCP pointer from the mapping index is selected from the location pointed to by the offset value.

At process 840 the byte from the Data RCP at the location pointed to by the RCP pointer value is selected.

At process 842, the retrieved byte is appended to the next location of the Key RCP.

At process 844, a test is performed to determine if the Key RCP is full. If so, the process ends.

If the Key RCP is not full, process 846 uses the mapping parameters to define a new offset into the mapping index. After the new offset is obtained, the mapping process 830 loops back to process 834 and repeats until the Key RCP is fully populated.

The mapping process 830, as well as other suitable mapping processes, may be used in the processes 900 and 920 described below with the description of FIG. 9. These mapping processes may also be referred to herein as pad mapping. In addition, while the Data RCP and Key RCP are described such that each location includes a single byte, other sizes, such as, for example 16-bit words, 32-bit words, and 64-bit words may be used.

FIG. 9 illustrates processes for creating a new RCP on the RCP server 710, generating a new RCP from an encrypted RCP on a client, sending an encrypted message, and decrypting a received message.

Process 900 is a process for creating a new RCP on the RCP server 710. At process 902, a pad mapping according to process 830, or other suitable process for defining a path through the mapping index, is performed to obtain a Key RCP from a Data RCP, the new Key RCP may be stored in the RCP pool.

At process 904, the Data RCP is XORed with a current Key RCP retrieved from the RCP pool to obtain a new encrypted Data RCP. As stated earlier, XOR is one example of a symmetric encryption that may be used. Other embodiments may use a different type of symmetric encryption.

At process 908, a unique Key RCP identifier may be prepended to the new encrypted Data RCP. The prepending is a non-limiting example. The Key RCP identifier could be placed at other locations within the encrypted Data RCP as long as the Key RCP identifier can be used to define the same Key RCP in a Key RCP pool by both the sender and receiver.

At process 910, the encrypted Data RCP with the key RCP identifier included is sent to the RCP client pair (760A and 760B).

Process 920 is a process for generating a new RCP from an encrypted RCP on a client 760. This process 920 is performed on each client of the RCP client pair (760A and 760B).

At process 922, the encrypted Data RCP with the Key RCP identifier included is received by the client 760 and the Key RCP identifier is extracted from the encrypted Data RCP.

At process 924, the Key RCP identifier is used to select a current Key RCP and the current Key RCP is XORed with the Data RCP to obtain a new decrypted Data RCP. As stated earlier, XOR is one example of a symmetric encryption that may be used. Other embodiments may use a different type of symmetric encryption.

At process 926, a pad mapping according to process 830, or other suitable process for defining a path through the mapping index, may be performed to obtain a Key RCP from the Data RCP. The new Key RCP may be stored in the RCP pool.

At process 928, the new decrypted Data RCP is stored in one of the Data RCP pools 772 (send or receive) the Key RCP Pool 768 (when building a reserve of Key RCPs), or the mapping index 767 when directed by the asset inventory thread 750 from the RCP server 710.

Process 940 is a process for encrypting a client message and sending the encrypted message. At process 942, a Data RCP 774 is obtained from the send Data RCP Pool 772. In some embodiments that do not enable full duplex communication, there may be a single Data RCP pool 772 rather than a send Data RCP pool 772 and a receive Data RCP pool 772.

At process 944, an unencrypted client message 778 is XORed 776 with the Data RCP 774 to obtain an encrypted message. As stated earlier, XOR is one example of a symmetric encryption that may be used. Other embodiments may use a different type of symmetric encryption.

At process 946, the encrypted message is sent to the other client participating in this client pair.

Process 960 is a process for receiving an encrypted message and decrypting the message. At process 962, the encrypted message is received from the other client participating in this client pair.

At process 964, a Data RCP 774 is obtained from the receive Data RCP Pool 772. In some embodiments that do not enable full duplex communication, there may be a single Data RCP pool 772 rather than a send Data RCP pool 772 and a receive Data RCP pool 772.

At process 966, the encrypted client message is XORed 776 with the Data RCP 774 to obtain an unencrypted client message 778. As stated earlier, XOR is one example of a symmetric encryption that may be used. Other embodiments may use a different type of symmetric encryption.

Figure 10:
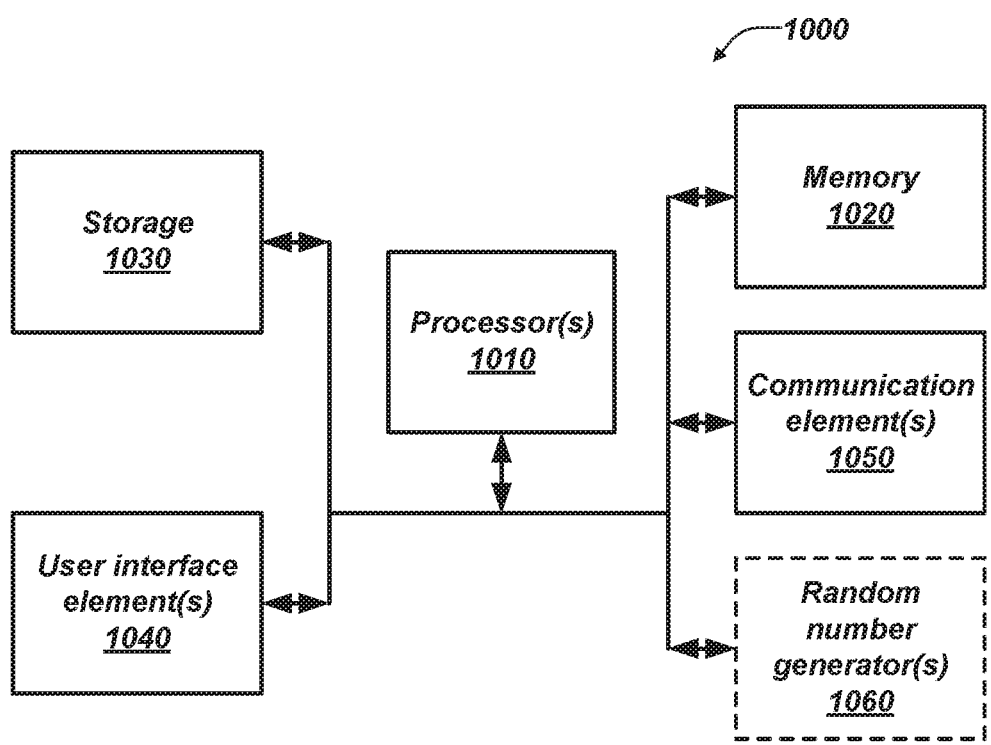
FIG. 10 is a block diagram illustrating a computing system for practicing embodiments of the present disclosure.

FIG. 10 illustrates a computing system 1000 for practicing embodiments of the present disclosure. As non-limiting examples, the computing system 1000 may be a user-type computer, a file server, a compute server, a notebook computer, a tablet, a handheld device, a mobile device, or other similar computer system for executing software. Computer, computing system, and server may be used interchangeably herein to indicate a system for practicing embodiments of the present disclosure. The computing system 1000 is configured for executing software programs containing computing instructions and includes one or more processors 1010, memory 1020, storage 1030, user interface elements 1040, and one or more communication elements 1050. Some embodiments of the computing system 1000 may include one or more random number generators 1060 as explained more fully above.

The one or more processors 1010 may be configured for executing a wide variety of operating systems and applications including computing instructions for carrying out embodiments of the present disclosure.

The memory 1020 may be used to hold computing instructions, data structures, and other information for performing a wide variety of tasks including performing embodiments of the present disclosure. By way of example, and not limitation, the memory 1020 may include Synchronous Random Access Memory (SRAM), Dynamic RAM (DRAM), Read-Only Memory (ROM), flash memory, and the like.

The memory 1020 may include other types of memory devices, including volatile storage devices or non-volatile storage devices, configured to store information. Examples of other types of memory 1020 include nano RAM or (NRAM), nanocrystal wire-based memory, silicon-oxide based sub-10 nanometer process memory, graphene memory, Silicon-Oxide-Nitride-Oxide-Silicon (SONOS), Resistive random-access memory (RRAM), programmable metallization cell (PMC), conductive-bridging RAM (CBRAM), magneto-resistive RAM (MRAM), phase change RAM (PCRAM), phase change memory, or other solid-state storage media.

The storage 1030 may be used for storing relatively large amounts of non-volatile information for use in the computing system 1000 and may be configured as one or more storage devices. By way of example, and not limitation, these storage devices may include computer-readable media (CRM). This CRM may include, but is not limited to, magnetic and optical storage devices such as disk drives, magnetic tapes, optical storage drives such as CDs (compact disks), DVDs (digital versatile discs or digital video discs), and other equivalent storage devices.

Information related to the computing system 1000 may be presented to, and received from, a user with one or more user interface elements 1040. As non-limiting examples, the user interface elements 1040 may include elements such as displays, keyboards, mice, joysticks, haptic devices, microphones, speakers, cameras, and touchscreens. A display on the computing system may be configured to present a graphical user interface (GUI) with information about the embodiments of the present disclosure.

The communication elements 1050 may be configured for communicating with other devices or communication networks. As non-limiting examples, the communication elements 1050 may include elements for communicating on wired and wireless communication media, such as, for example, serial ports, parallel ports, Ethernet connections, universal serial bus (USB) connections IEEE 1394 ("firewire") connections, lightning connections, thunderbolt connections, BLUETOOTH® wireless connections, 802.1 a/b/g/n type wireless connections, cellular phone connections, TCP/IP, FTP, HTTP, and other suitable communication interfaces and protocols.

Software processes illustrated herein are intended to illustrate representative processes that may be performed by the systems illustrated herein. Unless specified otherwise, the order in which the process acts are described is not intended to be construed as a limitation, and acts described as occurring sequentially may occur in a different sequence, or in one or more parallel process streams. It will be appreciated by those of ordinary skill in the art that many steps and processes may occur in addition to those outlined in flow charts. Furthermore, the processes may be implemented in any suitable hardware, software, firmware, or combinations thereof.

By way of non-limiting example, computing instructions for performing the processes may be stored on the storage 1040, transferred to the memory 1020 for execution, and executed by the processors 1010. The processors 1010, when executing computing instructions configured for performing the processes, constitute structure for performing the processes and can be considered a special-purpose computer when so configured. In addition, some or all portions of the processes may be performed by hardware specifically configured for carrying out the processes.

Many of the functional units described in this specification may be labeled as modules, threads, or other segregations of programming code, in order to more particularly emphasize their implementation independence. Modules may be at least partially implemented in hardware, in one form or another. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented using software, stored on a physical storage device 1030 (e.g., a computer-readable storage medium), in memory 1020, or a combination thereof for execution by various types of processors.

An identified module of executable code may, for instance, comprise one or more physical or logical blocks of computer instructions, which may, for instance, be organized as a thread, object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several storage 1030 or memory 1020 devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more physical devices, which are referred to herein as "computer-readable media."

In some embodiments, the software portions are stored in a non-transitory state such that the software portions, or representations thereof, persist in the same physical location for a period of time. Additionally, in some embodiments, the software portions are stored on one or more non-transitory storage devices, which include hardware elements capable of storing non-transitory states and/or signals representative of the software portions, even though other portions of the non-transitory storage devices may be capable of altering and/or transmitting the signals. One example of a non-transitory storage device includes a read-only memory (ROM) which can store signals and/or states representative of the software portions for a period of time. However, the ability to store the signals and/or states is not diminished by further functionality of transmitting signals that are the same as or representative of the stored signals and/or states. For example, a processor may access the ROM to obtain signals that are representative of the stored signals and/or states in order to execute the corresponding software instructions.

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventor.

What is claimed is:

1. A computer-implemented method for performing cryptography, comprising:
    encrypting a message with a source Random Cypher Key (RCK) to develop an encrypted message, wherein a length of the source RCK is the same as a message length of the message;
    determining a destination system for the encrypted message;
    maintaining the message in an encrypted state and further encrypting the encrypted message with a combined RCK associated with the destination system to develop a destination encrypted message wherein a length of the combined RCK is the same as the message length; and
    decrypting the destination encrypted message using a destination RCK to restore the message, wherein a length of the destination RCK is the same as the message length.

2. The computer-implemented method of claim 1, wherein further encrypting the encrypted message comprises:
    performing an XOR operation between the encrypted message and the destination RCK to develop an intermediate encrypted message; and
    performing an XOR operation between the intermediate encrypted message and the source RCK to develop the destination encrypted message.

3. The computer-implemented method of claim 1, wherein further encrypting the encrypted message comprises:
    performing an XOR operation between the source RCK and the destination RCK to develop an intermediate RCK; and
    performing an XOR operation between the encrypted message and the intermediate RCK to develop the destination encrypted message.

4. The computer-implemented method of claim 1, further comprising generating the source RCK and the destination RCK with a true random number generator.

5. The computer-implemented method of claim 1, further comprising generating the source RCK and the destination RCK with a quantum random number generator.

6. The computer-implemented method of claim 1, further comprising:
    determining a second destination system for the encrypted message;
    further encrypting the encrypted message with a second combined RCK associated with the second destination system to develop a second destination encrypted message wherein a length of the second combined RCK is the same as the message length; and
    decrypting the second destination encrypted message using a second destination RCK to restore the message, wherein a length of the second destination RCK is the same as the message length.

7. The computer-implemented method of claim 1, further comprising partially decrypting the destination encrypted message using the source RCK.

8. A cryptographic system, comprising:
    a source system comprising:
        one or more source Random Cypher Pads (RCPs) stored thereon; and
        processing circuitry configured for encrypting a message with the one or more source RCPs to develop an encrypted message; and
    a cryptographic data server comprising:
        the one or more source RCPs stored thereon;
        one or more destination RCPs stored thereon; and
        processing circuitry configured for:
            receiving the encrypted message;
            further encrypting the encrypted message with the one or more destination RCPs, to develop an intermediate encrypted message; and
            partially decrypting the intermediate encrypted message using the one or more source RCPs to develop a destination encrypted message; and
    a destination system comprising:
        the one or more destination RCPs stored thereon; and
        processing circuitry configured for:
            receiving the destination encrypted message; and
            decrypting the destination encrypted message using the one or more destination RCPs to restore the message.

9. The cryptographic system of claim 8, further comprising a second destination system for the encrypted message and wherein:
    the cryptographic data server further comprises one or more second destination RCPs stored thereon and the processing circuitry on the cryptographic data server is further configured for:
        further encrypting the encrypted message with the one or more second destination RCPs to develop a second intermediate encrypted message;

partially decrypting the second intermediate encrypted message using the one or more source RCPs to develop a second destination encrypted message; and the second destination system comprises:
the one or more second destination RCPs stored thereon; and
processing circuitry configured for:
receiving the second destination encrypted message; and
decrypting the second destination encrypted message using the one or more second destination RCPs to restore the message.

10. The cryptographic system of claim 8, wherein the cryptographic data server is further configured to securely distribute the one or more source RCPs to the source system and the one or more destination RCPs to the destination system.

11. The cryptographic system of claim 8, further comprising a true random number generator configured for generating the one or more source RCPs and the one or more destination RCPs as collections of true random numbers.

12. The cryptographic system of claim 11, wherein the true random number generator comprises a quantum random number generator.

13. A cryptographic system, comprising:
a source system comprising:
one or more source Random Cypher Pads (RCPs) stored thereon; and
processing circuitry configured for encrypting a message with the one or more source RCPs to develop an encrypted message; and
a cryptographic data server comprising processing circuitry configured for:
receiving the encrypted message;
identifying a destination system for the encrypted message;
requesting a combined RCK by identifying the source system, the destination system, and a message length; and
maintaining the message in an encrypted state and further encrypting the encrypted message with the combined RCK to develop a destination encrypted message;
a key server comprising:
the one or more source RCPs stored thereon;
one or more destination RCPs stored thereon; and
processing circuitry configured for:
developing the combined RCK responsive to the request from the cryptographic data server by performing an operation to combine the one or more source RCPs, with the one or more destination RCPs; and
transmitting the combined RCK to the cryptographic data server;
the destination system comprising:
the one or more destination RCPs stored thereon; and
processing circuitry configured for:
receiving the destination encrypted message; and
decrypting the destination encrypted message using the one or more destination RCPs to restore the message.

14. The cryptographic system of claim 13, further comprising a second destination system for the encrypted message and wherein:
the processing circuitry on the cryptographic data server is further configured for:

identifying the second destination system; and
requesting a second combined RCK by identifying the source system, the second destination system, and the message length; and
further encrypting the encrypted message with the second combined RCK to develop a second destination encrypted message;
the key server further comprises one or more second destination RCPs stored thereon and the processing circuitry on the key server is further configured for:
developing the second combined RCK responsive to the request from the server by performing an operation to combine the one or more source RCPs, with the one or more second destination RCPs; and
transmitting the second combined RCK to the server;
the second destination system comprises:
the one or more second destination RCPs stored thereon; and
processing circuitry configured for:
receiving the second destination encrypted message; and
decrypting the second destination encrypted message using the one or more second destination RCPs to restore the message.

15. The cryptographic system of claim 13, wherein the key server further comprises a true random number generator for generating the one or more source RCPs and the one or more destination RCPs as collections of true random numbers.

16. The cryptographic system of claim 13, wherein the key server is further configured to securely distribute the one or more source RCPs to the source system and the one or more destination RCPs to the destination system.

17. The cryptographic system of claim 13, wherein the cryptographic data server is further configured to partially decrypt the destination encrypted message using the one or more source RCPs.

18. A cryptographic system, comprising:
a first computing system comprising a portable network gateway, the first computing system comprising:
a first copy of one or more RCPs stored thereon; and
processing circuitry configured to:
receive an unencrypted message from a transmitting client via the portable network gateway;
combine the unencrypted message with the first copy of the one or more RCPs with an operation to develop an encrypted message;
transmit the encrypted message;
receive and route multiple unencrypted messages from multiple transmitting clients via the portable network gateway;
encrypt the multiple unencrypted messages to generate multiple encrypted messages; and
transmit the multiple encrypted messages through a secure private tunnel; and
a second computing system comprising a cryptographic data server, comprising:
a second copy of the one or more RCPs stored thereon; and
processing circuitry configured to:
receive the encrypted message from the first computing system;
combine the encrypted message with the second copy of the one or more RCPs with an operation to develop a decrypted message;
forward the decrypted message to a receiving client;

receive the multiple encrypted messages through the secure private tunnel;

decrypt the multiple encrypted messages; and send the multiple decrypted messages to an enterprise server.

19. The cryptographic system of claim 18, further comprising a key server configured to securely distribute the first copy of the one or more RCPs to the first computing system and the second copy of the one or more RCPs to the second computing system.

20. The cryptographic system of claim 19, wherein the key server further comprises a true random number generator configured for generating the one or more RCPs as collections of true random numbers.

21. The cryptographic system of claim 18, wherein the second computing system is further configured to securely distribute the one or more RCPs to the first computing system as the first copy of the one or more RCPs.

* * * * *